(12) United States Patent
Williams, Jr. et al.

(10) Patent No.: US 8,789,842 B2
(45) Date of Patent: Jul. 29, 2014

(54) WEIGHT DISTRIBUTION HITCH APPARATUS

(71) Applicant: Williams Innovations, LLC, Morrisville, NC (US)

(72) Inventors: Thomas M. Williams, Jr., Durham, NC (US); Gregory S. Hopper, Raleigh, NC (US); David Allen Dekarske, Waterford, MI (US)

(73) Assignee: TeleSwivel, LLC, Durham, NC (US)

( * ) Notice: Subject to any disclaimer, the term of this patent is extended or adjusted under 35 U.S.C. 154(b) by 0 days.

(21) Appl. No.: 13/663,021

(22) Filed: Oct. 29, 2012

(65) Prior Publication Data

US 2013/0049326 A1 Feb. 28, 2013

Related U.S. Application Data

(62) Division of application No. 12/939,644, filed on Nov. 4, 2010, now Pat. No. 8,302,987.

(51) Int. Cl.
*B60D 1/36* (2006.01)
*B60D 1/24* (2006.01)
*B60D 1/40* (2006.01)
*B60D 1/34* (2006.01)

(52) U.S. Cl.
CPC .. *B60D 1/24* (2013.01); *B60D 1/40* (2013.01); *B60D 1/345* (2013.01)
USPC .................. 280/479.3; 280/478.1; 280/406.1

(58) Field of Classification Search
CPC .......... B60D 1/345; B60D 1/247; B60D 1/40; B60D 1/155; B60D 1/36
USPC ............ 280/405.1, 406.1, 477, 478.1, 479.2, 280/479.3, 490.1
See application file for complete search history.

(56) References Cited

U.S. PATENT DOCUMENTS

| | | | |
|---|---|---|---|
| 2,988,383 A | 6/1961 | Carson |
| 3,057,644 A | 10/1962 | Fisher |
| 3,093,395 A | 6/1963 | Boutwell |
| 3,140,881 A | 7/1964 | Antici |
| 3,169,028 A | 2/1965 | Scrivner |

(Continued)

OTHER PUBLICATIONS

International Search Report and Written Opinion of the International Searching Authority and Written Opinion of the International Searching Authority corresponding to International application No. PCT/US2010/055579; Date of Mailing: Dec. 26, 2011; 12 pages.

*Primary Examiner* — Tony Winner
(74) *Attorney, Agent, or Firm* — Myers Bigel Sibley & Sajovec, P.A.

(57) ABSTRACT

A hitch apparatus includes a housing configured to be attached to a vehicle, a tow bar movably disposed within the housing, and a weight distribution apparatus attached to a distal end of the tow bar. The tow bar is movable relative to the housing between retracted and extended positions, and is pivotable relative to the housing when in an extended position. The weight distribution apparatus comprises a hitch member configured to receive a coupling apparatus of a towed vehicle, and at least one weight distributing member configured to extend rearwardly from the vehicle and be attached to the towed vehicle. The hitch member may be any type of coupling apparatus such as a ball coupler, a pintle hook, a cushioned pintle hook, a swivel pintle hook, a lunette ring, and a clevis pin attachment.

6 Claims, 17 Drawing Sheets

(56) References Cited

U.S. PATENT DOCUMENTS

| | | |
|---|---|---|
| 3,169,782 A | 2/1965 | Columbus |
| 3,207,530 A | 9/1965 | Paun |
| 3,243,202 A | 3/1966 | Carson |
| 3,279,825 A | 10/1966 | Boutwell |
| 3,400,949 A | 9/1968 | Kendall |
| 3,410,577 A | 11/1968 | Luinstra |
| 3,596,925 A | 8/1971 | Richie |
| 3,659,875 A | 5/1972 | Masar |
| 3,675,947 A | 7/1972 | Blagg |
| 3,700,053 A | 10/1972 | Glissendorf |
| 3,702,029 A | 11/1972 | Anderson, Jr. |
| 3,720,000 A | 3/1973 | Schlegel |
| 3,734,539 A | 5/1973 | Salmi |
| 3,740,077 A | 6/1973 | Williams |
| 3,747,958 A | 7/1973 | Hackett |
| 3,767,230 A | 10/1973 | DeVries |
| 3,773,356 A | 11/1973 | Eichels et al. |
| 3,774,149 A | 11/1973 | Bennett |
| 3,807,767 A | 4/1974 | Moline |
| 3,818,599 A | 6/1974 | Tague |
| 3,833,243 A | 9/1974 | Hanson |
| 3,858,966 A | 1/1975 | Lowell, Jr. |
| 3,860,267 A | 1/1975 | Lyons |
| 3,867,898 A | 2/1975 | Lakamp |
| 3,879,062 A | 4/1975 | Miller |
| 3,881,748 A | 5/1975 | Donaldson |
| 3,889,384 A | 6/1975 | White |
| 3,891,237 A | 6/1975 | Allen |
| 3,891,238 A | 6/1975 | Ehlert |
| 3,901,536 A | 8/1975 | Black |
| 3,909,033 A | 9/1975 | Russell, Jr. |
| RE28,590 E | 10/1975 | Salmi |
| 3,912,119 A | 10/1975 | Hill et al. |
| 3,912,302 A | 10/1975 | Patterson |
| 3,918,746 A | 11/1975 | Lehtisaari |
| 3,922,006 A | 11/1975 | Borges |
| 3,924,257 A | 12/1975 | Roberts |
| 3,929,237 A | 12/1975 | Schaedler |
| 3,944,259 A | 3/1976 | Miller |
| 3,961,677 A | 6/1976 | Geisthoff |
| 3,964,767 A | 6/1976 | Williams |
| 3,966,231 A | 6/1976 | Metzler |
| 4,012,056 A | 3/1977 | Christensen |
| 4,030,775 A | 6/1977 | Hill |
| 4,054,302 A | 10/1977 | Campbell |
| 4,057,266 A | 11/1977 | Duncan et al. |
| 4,065,147 A | 12/1977 | Ross |
| 4,078,774 A | 3/1978 | Williams |
| 4,131,295 A | 12/1978 | Highberger |
| 4,131,296 A | 12/1978 | Strader |
| 4,134,602 A | 1/1979 | Boger |
| 4,156,972 A | 6/1979 | Vankrevelen |
| 4,169,610 A | 10/1979 | Paufler |
| 4,173,353 A | 11/1979 | Steele |
| 4,178,011 A | 12/1979 | Kirsch |
| 4,186,939 A | 2/1980 | Woods et al. |
| 4,187,494 A | 2/1980 | Jessee |
| 4,192,526 A | 3/1980 | Myers |
| 4,205,453 A | 6/1980 | Steele |
| 4,225,149 A | 9/1980 | Koopman |
| 4,226,438 A | 10/1980 | Collins |
| 4,254,968 A | 3/1981 | DelVecchio |
| 4,254,969 A | 3/1981 | Martin |
| 4,265,465 A | 5/1981 | Deitrich, Sr. |
| 4,269,428 A | 5/1981 | Rexine |
| 4,313,264 A | 2/1982 | Miller, Sr. |
| 4,416,466 A | 11/1983 | Park |
| 4,417,748 A | 11/1983 | Dortch |
| 4,431,208 A | 2/1984 | Geeves |
| 4,432,563 A | 2/1984 | Pitcher |
| 4,484,760 A | 11/1984 | Rach |
| 4,511,159 A | 4/1985 | Younger |
| 4,515,387 A | 5/1985 | Schuck |
| 4,537,416 A | 8/1985 | Linaburg |
| 4,545,595 A | 10/1985 | Gray |
| 4,552,376 A | 11/1985 | Cofer |
| 4,560,183 A | 12/1985 | Cook |
| 4,560,184 A | 12/1985 | Williams, Jr. |
| 4,583,481 A | 4/1986 | Garrison |
| 4,603,878 A | 8/1986 | Smith, Jr. |
| 4,606,549 A | 8/1986 | Williams, Jr. |
| 4,613,149 A | 9/1986 | Williams, Jr. |
| 4,614,356 A | 9/1986 | Mills |
| 4,621,432 A | 11/1986 | Law |
| 4,627,634 A | 12/1986 | Coleman |
| 4,650,207 A | 3/1987 | Ackermann |
| 4,657,275 A | 4/1987 | Carroll |
| 4,657,276 A | 4/1987 | Hamerl |
| 4,666,176 A | 5/1987 | Sand |
| 4,666,177 A | 5/1987 | Vinchattle |
| 4,674,942 A | 6/1987 | Assh et al. |
| 4,687,220 A | 8/1987 | Danielson |
| 4,708,359 A | 11/1987 | Davenport |
| 4,759,564 A | 7/1988 | Williams, Jr. |
| 4,772,040 A | 9/1988 | Klemm |
| 4,781,394 A | 11/1988 | Schwarz et al. |
| 4,792,151 A | 12/1988 | Feld |
| 4,799,705 A | 1/1989 | Janes et al. |
| 4,802,686 A | 2/1989 | Isreal |
| 4,807,714 A | 2/1989 | Blau et al. |
| 4,807,899 A | 2/1989 | Belcher |
| 4,811,965 A | 3/1989 | Eubanks |
| 4,815,752 A * | 3/1989 | Young et al. ............... 280/406.2 |
| 4,840,392 A | 6/1989 | Baskett |
| 4,844,496 A | 7/1989 | Webb et al. |
| 4,844,497 A | 7/1989 | Allen |
| 4,852,901 A | 8/1989 | Beasley et al. |
| 4,854,604 A | 8/1989 | Stallsworth |
| 4,861,061 A | 8/1989 | Frantz |
| 4,871,184 A | 10/1989 | Johnson |
| 4,871,185 A | 10/1989 | Chakroff et al. |
| 4,903,978 A | 2/1990 | Schrum, III |
| 4,905,376 A | 3/1990 | Neeley |
| 4,913,451 A | 4/1990 | Woodall |
| 4,938,495 A | 7/1990 | Beasley et al. |
| 4,944,525 A | 7/1990 | Landry |
| 4,951,957 A | 8/1990 | Gullickson |
| 4,953,883 A | 9/1990 | Helie |
| 4,958,436 A | 9/1990 | Tusche |
| 4,961,589 A | 10/1990 | Faurenhoff |
| 4,961,590 A | 10/1990 | Davenport |
| 4,974,866 A | 12/1990 | Morgan |
| 4,976,453 A | 12/1990 | Kaplan |
| 4,988,116 A | 1/1991 | Evertsen |
| 4,991,865 A | 2/1991 | Francisco |
| 5,000,471 A | 3/1991 | Sumrall |
| 5,005,852 A | 4/1991 | Smyly, Sr. |
| 5,009,444 A | 4/1991 | Williams, Jr. |
| 5,009,445 A | 4/1991 | Williams, Jr. |
| 5,009,446 A | 4/1991 | Davis |
| 5,016,900 A | 5/1991 | McCully |
| 5,035,441 A | 7/1991 | Murray |
| 5,036,593 A | 8/1991 | Collier |
| 5,037,123 A | 8/1991 | Smith |
| 5,048,854 A | 9/1991 | Clark |
| 5,067,742 A | 11/1991 | Relja |
| 5,080,386 A | 1/1992 | Lazar |
| 5,085,408 A | 2/1992 | Norton et al. |
| 5,108,123 A | 4/1992 | Rubenzik |
| 5,113,588 A | 5/1992 | Walston |
| 5,114,168 A | 5/1992 | Kehl |
| 5,114,170 A | 5/1992 | Lanni et al. |
| 5,115,572 A | 5/1992 | Harbison |
| 5,161,815 A | 11/1992 | Penor, Jr. |
| 5,180,182 A | 1/1993 | Haworth |
| 5,188,385 A | 2/1993 | Wilson |
| 5,191,328 A | 3/1993 | Nelson |
| 5,195,769 A | 3/1993 | Williams, Jr. |
| 5,201,539 A | 4/1993 | Mayfield |
| 5,203,582 A | 4/1993 | Smyly, Sr. |
| 5,213,354 A | 5/1993 | Vaughn |
| 5,224,270 A | 7/1993 | Burrus |
| 5,236,214 A | 8/1993 | Taylor |
| 5,236,215 A | 8/1993 | Wylie |

(56) References Cited

U.S. PATENT DOCUMENTS

| | | |
|---|---|---|
| 5,257,797 A | 11/1993 | Johnson |
| 5,269,554 A | 12/1993 | Law et al. |
| 5,277,446 A | 1/1994 | Hamel |
| 5,277,447 A | 1/1994 | Blaser |
| 5,286,050 A | 2/1994 | Stallings, Jr. et al. |
| 5,288,095 A | 2/1994 | Swindall |
| 5,288,096 A | 2/1994 | Degelman |
| 5,290,056 A | 3/1994 | Fath, IV |
| 5,309,289 A | 5/1994 | Johnson |
| 5,316,330 A | 5/1994 | Bergeron |
| 5,322,315 A | 6/1994 | Carsten |
| 5,330,196 A | 7/1994 | Ricles |
| 5,335,930 A | 8/1994 | Tighe |
| 5,342,076 A | 8/1994 | Swindall |
| 5,348,329 A | 9/1994 | Morin et al. |
| 5,358,269 A | 10/1994 | Jakeman et al. |
| 5,382,042 A | 1/1995 | McPhee et al. |
| 5,405,160 A | 4/1995 | Weaver |
| 5,413,369 A | 5/1995 | Trent |
| 5,454,582 A | 10/1995 | Rines |
| 5,461,471 A | 10/1995 | Sommerfeld |
| 5,465,992 A | 11/1995 | Anderson |
| 5,468,007 A | 11/1995 | Kanerva |
| 5,478,101 A | 12/1995 | Roberson |
| 5,482,310 A | 1/1996 | Staggs |
| 5,503,422 A | 4/1996 | Austin |
| 5,503,423 A | 4/1996 | Roberts et al. |
| 5,516,139 A | 5/1996 | Woods |
| 5,518,263 A | 5/1996 | Owens |
| 5,529,330 A | 6/1996 | Roman |
| 5,547,210 A | 8/1996 | Dugger |
| 5,558,352 A | 9/1996 | Mills |
| 5,580,088 A | 12/1996 | Griffith |
| 5,593,171 A | 1/1997 | Shields |
| 5,636,885 A | 6/1997 | Hummel |
| 5,657,175 A | 8/1997 | Brewington |
| 5,669,621 A | 9/1997 | Lockwood |
| 5,680,706 A | 10/1997 | Talcott |
| 5,725,232 A | 3/1998 | Fleming |
| 5,729,194 A | 3/1998 | Spears et al. |
| 5,758,893 A | 6/1998 | Schultz |
| 5,769,443 A | 6/1998 | Muzny |
| 5,779,256 A | 7/1998 | Vass |
| 5,784,213 A | 7/1998 | Howard |
| 5,797,616 A | 8/1998 | Clement |
| 5,806,196 A | 9/1998 | Gibbs et al. |
| 5,821,852 A | 10/1998 | Fairchild |
| 5,882,029 A | 3/1999 | Kennedy |
| 5,890,617 A | 4/1999 | Rowland et al. |
| 5,909,892 A | 6/1999 | Richardson |
| 5,927,229 A | 7/1999 | Karr, Jr. |
| 5,927,742 A | 7/1999 | Draper |
| 5,941,551 A | 8/1999 | Harman et al. |
| 5,951,035 A | 9/1999 | Phillips, Jr. et al. |
| 5,951,036 A | 9/1999 | Sargent |
| 5,979,927 A | 11/1999 | Hale |
| 5,992,871 A | 11/1999 | Rowland et al. |
| 6,042,136 A | 3/2000 | Heinecke |
| 6,045,147 A | 4/2000 | Schmidt et al. |
| 6,068,281 A | 5/2000 | Szczypski |
| 6,076,847 A | 6/2000 | Thornton |
| 6,102,422 A | 8/2000 | Damron |
| 6,102,423 A | 8/2000 | Beck et al. |
| 6,120,052 A | 9/2000 | Capik et al. |
| 6,139,041 A | 10/2000 | Murphy |
| 6,168,181 B1 | 1/2001 | Gadd |
| 6,170,852 B1 | 1/2001 | Kimbrough |
| 6,173,984 B1 | 1/2001 | Kay |
| 6,176,505 B1 | 1/2001 | Capik et al. |
| 6,178,650 B1 | 1/2001 | Thibodeaux |
| 6,193,258 B1 | 2/2001 | Kennedy |
| 6,199,503 B1 | 3/2001 | Midgett |
| 6,209,902 B1 | 4/2001 | Potts |
| 6,213,608 B1 | 4/2001 | Osgood |
| 6,222,457 B1 | 4/2001 | Mills et al. |
| 6,234,510 B1 | 5/2001 | Hammons |
| 6,239,926 B1 | 5/2001 | De Shazer |
| 6,273,448 B1 | 8/2001 | Cross |
| 6,279,940 B1 | 8/2001 | Beavington |
| 6,286,851 B1 | 9/2001 | Sargent |
| 6,286,852 B1 | 9/2001 | Slatten |
| 6,299,191 B1 | 10/2001 | Sargent |
| 6,318,747 B1 | 11/2001 | Ratican |
| 6,341,794 B1 | 1/2002 | Hunter |
| 6,357,126 B1 | 3/2002 | Gillen, Jr. |
| 6,364,337 B1 | 4/2002 | Rowland et al. |
| 6,378,888 B1 | 4/2002 | Laurent |
| 6,382,653 B1 | 5/2002 | Bass |
| 6,386,514 B1 | 5/2002 | Ray |
| 6,386,572 B1 | 5/2002 | Cofer |
| 6,409,200 B1 | 6/2002 | Glass |
| 6,422,585 B1 | 7/2002 | Glass |
| 6,428,030 B2 | 8/2002 | Melesko et al. |
| 6,446,999 B1 | 9/2002 | Davis, Jr. |
| 6,454,290 B1 | 9/2002 | Turner |
| 6,478,325 B1 | 11/2002 | Knauff |
| 6,480,104 B1 | 11/2002 | Wall et al. |
| 6,517,098 B2 | 2/2003 | Grasso et al. |
| 6,540,247 B1 | 4/2003 | Perkins |
| 6,585,281 B1 | 7/2003 | Voorting |
| 6,612,603 B2 | 9/2003 | Alger |
| 6,619,685 B2 | 9/2003 | Teague |
| 6,637,718 B2 | 10/2003 | Wilson |
| 6,644,680 B1 | 11/2003 | Coe |
| 6,651,996 B1 | 11/2003 | Allemang |
| 6,663,133 B1 | 12/2003 | Rosenlund |
| 6,698,783 B1 | 3/2004 | Zechbauer |
| 6,712,378 B1 | 3/2004 | Austin |
| 6,726,236 B2 | 4/2004 | Cofer |
| 6,749,213 B2 | 6/2004 | Kollath et al. |
| 6,758,485 B1 | 7/2004 | Voelker et al. |
| 6,796,573 B2 | 9/2004 | Beaudoin |
| 6,811,175 B1 | 11/2004 | Keyser |
| 6,820,888 B1 | 11/2004 | Griffin |
| 6,824,156 B2 | 11/2004 | Smith |
| 6,827,363 B1 | 12/2004 | Amerson |
| 6,834,878 B2 | 12/2004 | Koestler |
| 6,851,697 B2 | 2/2005 | Kinnard |
| 6,860,502 B1 | 3/2005 | Bolten |
| 6,863,294 B1 | 3/2005 | Bonham |
| 6,874,804 B2 | 4/2005 | Reese et al. |
| 6,880,849 B2 | 4/2005 | Teague |
| 6,889,994 B1 | 5/2005 | Birkenbaugh |
| 6,900,724 B2 | 5/2005 | Johnson |
| 6,905,132 B2 | 6/2005 | Pierce |
| 6,916,109 B2 | 7/2005 | Julicher |
| 6,932,374 B1 | 8/2005 | Timms et al. |
| 6,948,733 B2 | 9/2005 | Webster et al. |
| 6,951,345 B2 | 10/2005 | Wilks |
| 6,976,694 B1 | 12/2005 | Rayl et al. |
| 7,004,488 B2 | 2/2006 | Reiter et al. |
| 7,007,967 B2 | 3/2006 | Goettker |
| 7,036,840 B2 | 5/2006 | Kwilinski |
| 7,097,193 B1 | 8/2006 | Sievert |
| 7,111,863 B2 | 9/2006 | Ward et al. |
| 7,131,658 B2 | 11/2006 | MacKarvich |
| 7,134,679 B2 | 11/2006 | Krstovic |
| 7,192,047 B2 | 3/2007 | Sauermann |
| 7,207,589 B2 | 4/2007 | Givens |
| 7,226,070 B1 | 6/2007 | Duncan |
| 7,232,145 B1 | 6/2007 | Reece et al. |
| 7,264,260 B2 | 9/2007 | Overstreet |
| 7,290,755 B1 | 11/2007 | Thibodeaux |
| 7,293,791 B1 | 11/2007 | Williams, Jr. |
| 7,309,076 B2 | 12/2007 | Allen |
| 7,350,798 B1 | 4/2008 | Farrugia |
| 7,391,303 B2 | 6/2008 | Ball |
| 7,416,205 B1 | 8/2008 | Sam |
| 7,425,014 B1 | 9/2008 | Palmer |
| 7,431,318 B1 | 10/2008 | Frades |
| 7,451,996 B2 | 11/2008 | Miles et al. |
| 7,461,855 B2 | 12/2008 | Klar |
| 7,503,572 B2 | 3/2009 | Park et al. |
| 7,568,716 B2 | 8/2009 | Dietz |

(56) References Cited

U.S. PATENT DOCUMENTS

| | | |
|---|---|---|
| 7,571,922 B2 | 8/2009 | Pratchler |
| 7,584,983 B2 | 9/2009 | McKenney |
| 7,621,554 B1 | 11/2009 | Cremer |
| 7,669,876 B2 | 3/2010 | Kerpash, Sr. |
| 7,690,670 B1 | 4/2010 | Lincul |
| 7,690,671 B1 | 4/2010 | Jensen |
| 7,719,409 B1 | 5/2010 | Jones |
| 7,726,679 B2 | 6/2010 | Leuermann |
| 7,744,109 B2 | 6/2010 | Groh |
| 7,744,110 B1 | 6/2010 | Ramon |
| 7,753,393 B2 | 7/2010 | Young |
| 7,766,362 B1 | 8/2010 | Helton et al. |
| 7,770,870 B1 | 8/2010 | Fly |
| 7,780,323 B2 | 8/2010 | Nolle |
| 7,850,191 B1 | 12/2010 | Kaminski et al. |
| 7,850,192 B2 | 12/2010 | Ceccarelli et al. |
| 2001/0030409 A1 | 10/2001 | Williams |
| 2002/0003342 A1 | 1/2002 | Slatten |
| 2002/0005625 A1 | 1/2002 | Palmer |
| 2002/0008364 A1 | 1/2002 | Kahlstorf |
| 2002/0024195 A1 | 2/2002 | Heller |
| 2002/0056971 A1 | 5/2002 | Grasso et al. |
| 2002/0070529 A1 | 6/2002 | Dravecz |
| 2002/0089148 A1 | 7/2002 | Glass |
| 2002/0101055 A1 | 8/2002 | Warren |
| 2002/0105162 A1 | 8/2002 | Green |
| 2002/0117831 A1 | 8/2002 | Ahlquist et al. |
| 2002/0145268 A1 | 10/2002 | Zechbauer |
| 2002/0145269 A1 | 10/2002 | Carty |
| 2002/0189525 A1 | 12/2002 | Nathan |
| 2002/0195794 A1 | 12/2002 | Chumley |
| 2003/0011168 A1 | 1/2003 | Svensson |
| 2003/0030247 A1 | 2/2003 | Teague |
| 2003/0042707 A1 | 3/2003 | McCarty |
| 2003/0047909 A1 | 3/2003 | Alger |
| 2003/0051654 A1 | 3/2003 | Jarosek et al. |
| 2003/0052472 A1 | 3/2003 | Moss et al. |
| 2003/0075898 A1 | 4/2003 | Perkins |
| 2003/0080263 A1 | 5/2003 | McCoy |
| 2003/0094785 A1 | 5/2003 | Woods |
| 2003/0178809 A1 | 9/2003 | Anderson |
| 2003/0178810 A1 | 9/2003 | Reiter et al. |
| 2003/0209880 A1 | 11/2003 | Koestler |
| 2003/0218313 A1 | 11/2003 | Beaudoin |
| 2004/0017060 A1 | 1/2004 | Kinnard |
| 2004/0032112 A1 | 2/2004 | Reese et al. |
| 2004/0084876 A1 | 5/2004 | Losee |
| 2004/0094934 A1 | 5/2004 | Teague |
| 2004/0108685 A1 | 6/2004 | Pierce |
| 2004/0207176 A1 | 10/2004 | Webster et al. |
| 2004/0212175 A1 | 10/2004 | Jarosek |
| 2004/0217576 A1 | 11/2004 | Fox |
| 2004/0251659 A1 | 12/2004 | Amerson |
| 2005/0087955 A1 | 4/2005 | Kellogg |
| 2005/0121879 A1 | 6/2005 | Smith |
| 2005/0134020 A1 | 6/2005 | Wilks |
| 2005/0194761 A1 | 9/2005 | Givens |
| 2005/0218626 A1 | 10/2005 | Kwilinski |
| 2005/0230935 A1 | 10/2005 | Sauermann |
| 2006/0076755 A1 | 4/2006 | Bergeron |
| 2006/0097480 A1 | 5/2006 | Hegefeld |
| 2006/0097481 A1 | 5/2006 | Nicholas |
| 2006/0208455 A1 | 9/2006 | MacKarvich |
| 2006/0220345 A1 | 10/2006 | Schmidt |
| 2006/0255560 A1 | 11/2006 | Dietz |
| 2006/0273549 A1 | 12/2006 | Dietz |
| 2007/0007748 A1 | 1/2007 | Hancock |
| 2007/0029757 A1 | 2/2007 | Leuermann |
| 2007/0108731 A1 | 5/2007 | McBroom |
| 2007/0114760 A1 | 5/2007 | Hegefeld |
| 2007/0205580 A1 | 9/2007 | Hamilton et al. |
| 2007/0205581 A1 | 9/2007 | Wilcox |
| 2007/0216135 A1 | 9/2007 | Rebick et al. |
| 2007/0216136 A1 | 9/2007 | Dietz |
| 2007/0241535 A1 | 10/2007 | Salyers |
| 2007/0252359 A1 | 11/2007 | Wishart et al. |
| 2008/0036177 A1 | 2/2008 | McKenney |
| 2008/0073872 A1 | 3/2008 | Scott |
| 2008/0179861 A1 | 7/2008 | Columbia |
| 2008/0197606 A1 | 8/2008 | Capuano |
| 2008/0217885 A1 | 9/2008 | Woolever et al. |
| 2008/0246254 A1 | 10/2008 | Tyerman |
| 2008/0277903 A1 | 11/2008 | Anderson et al. |
| 2009/0014982 A1 | 1/2009 | Wulff |
| 2009/0033061 A1 | 2/2009 | Hensley |
| 2009/0045604 A1 | 2/2009 | Bernart |
| 2009/0057633 A1 | 3/2009 | Beck et al. |
| 2009/0072516 A1 | 3/2009 | Kuenzel |
| 2009/0072517 A1 | 3/2009 | Monostori et al. |
| 2009/0108563 A1 | 4/2009 | Groh |
| 2009/0127824 A1 | 5/2009 | Young |
| 2009/0127825 A1 | 5/2009 | Drake et al. |
| 2009/0146393 A1 | 6/2009 | Hawkins et al. |
| 2009/0189368 A1 | 7/2009 | Smith |
| 2009/0194969 A1 | 8/2009 | Bearey |
| 2009/0295123 A1 | 12/2009 | Good |
| 2010/0038882 A1 | 2/2010 | Chimento et al. |
| 2010/0109286 A1 | 5/2010 | Visser |
| 2010/0117332 A1 | 5/2010 | Harlin |
| 2010/0140900 A1 | 6/2010 | Zinn |
| 2010/0187489 A1 | 7/2010 | Hebert |
| 2010/0187793 A1 | 7/2010 | O'Quinn |
| 2010/0201100 A1 | 8/2010 | Hill |
| 2010/0264626 A1 | 10/2010 | Morehead |
| 2010/0289249 A1 | 11/2010 | McConnell |
| 2010/0314853 A1 | 12/2010 | Mallory |

\* cited by examiner

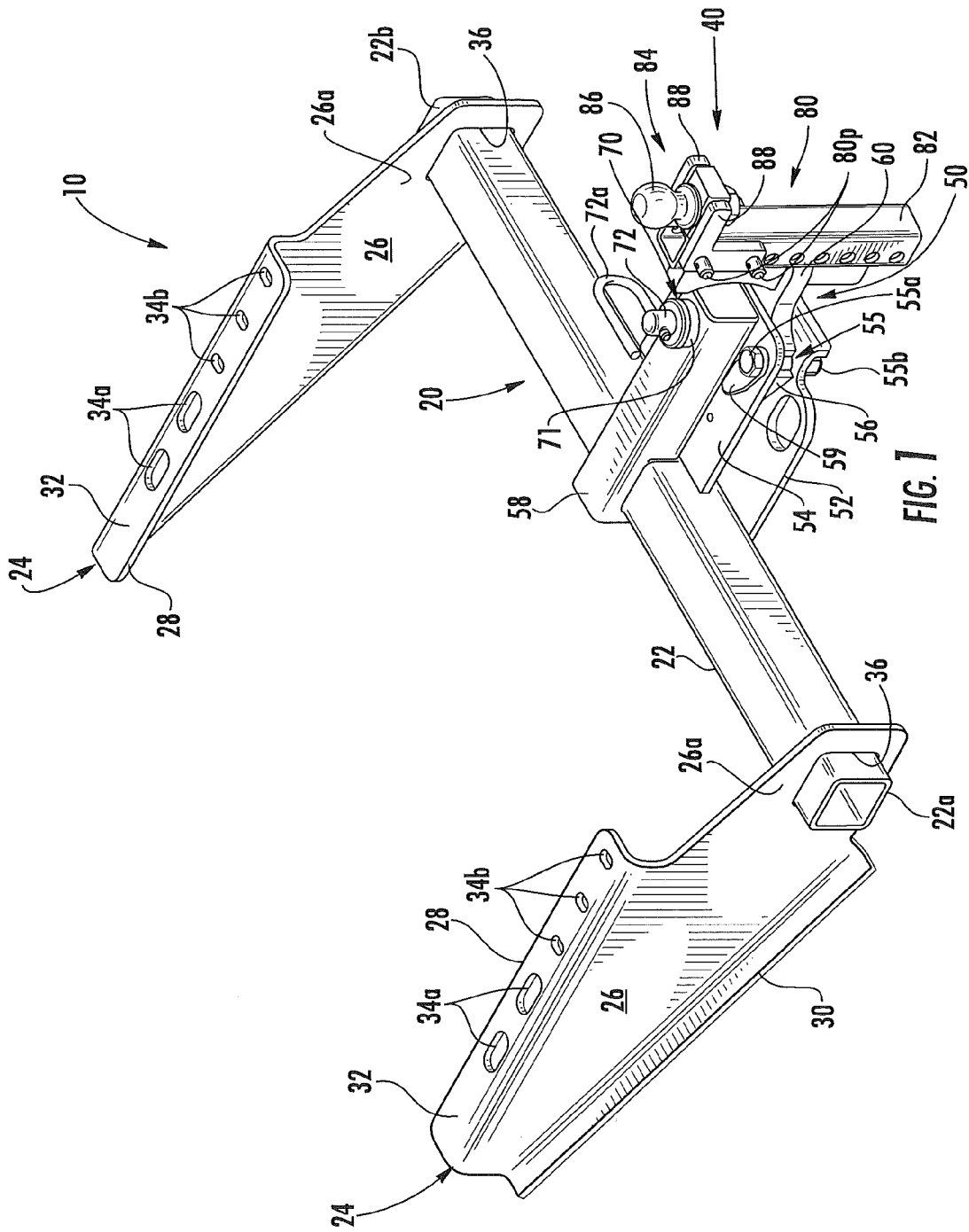

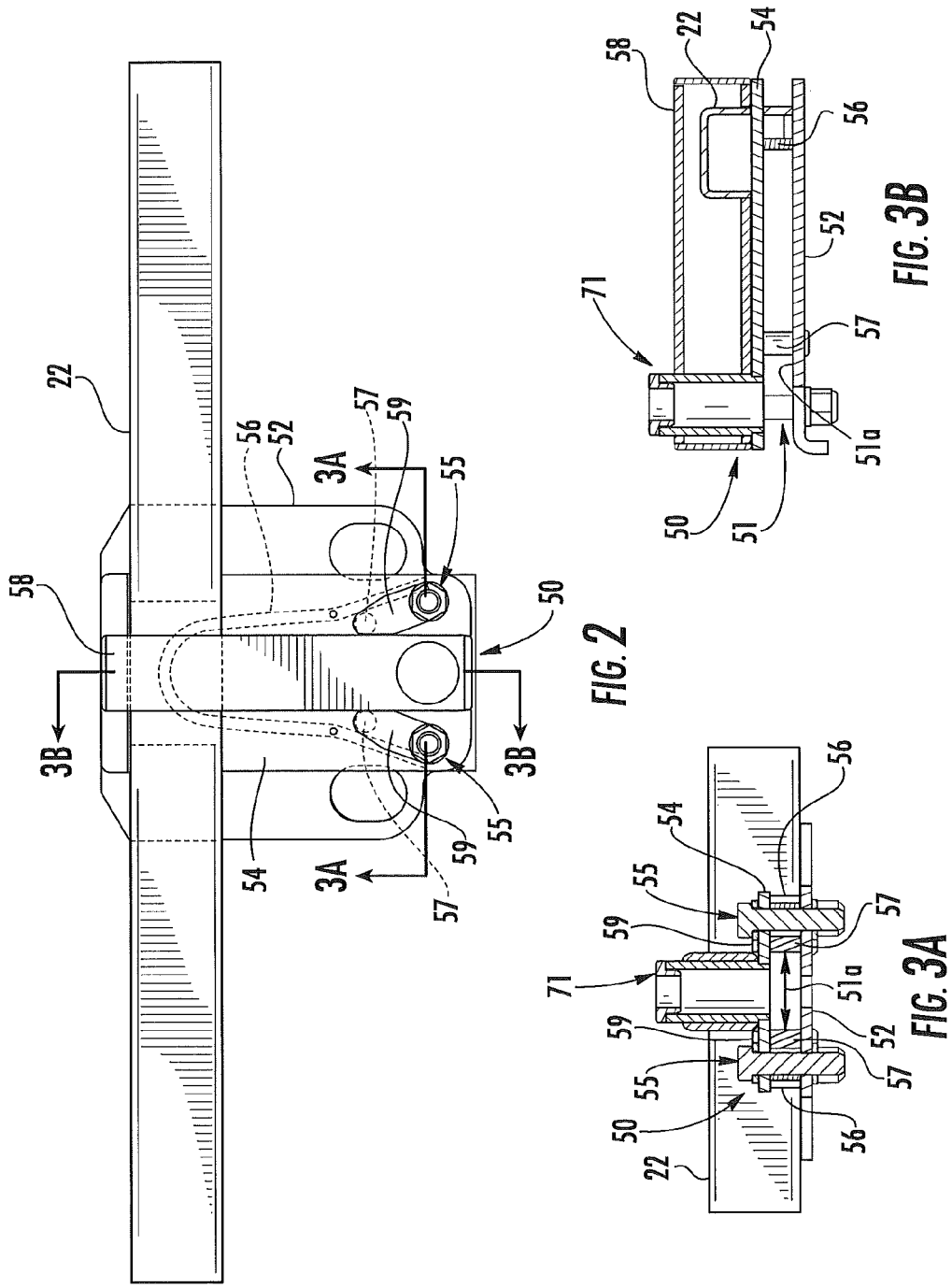

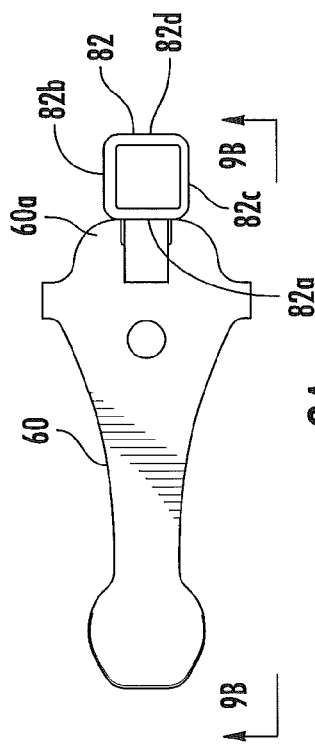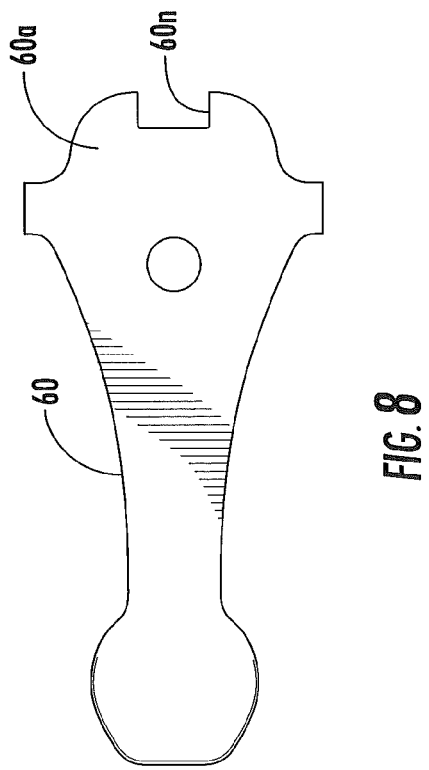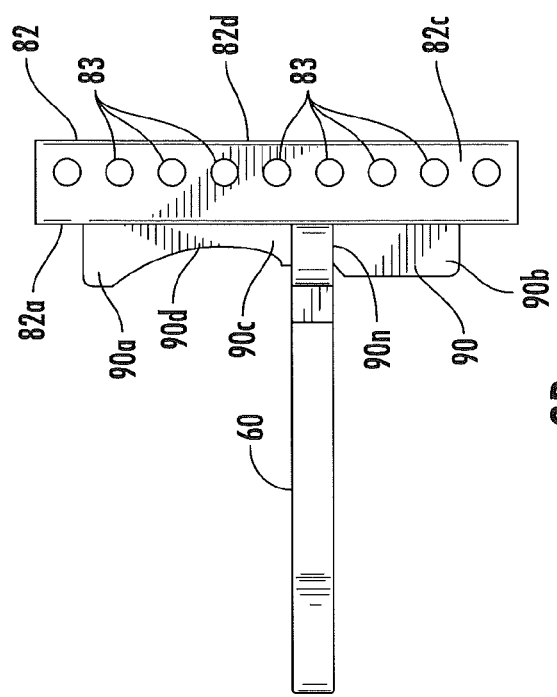

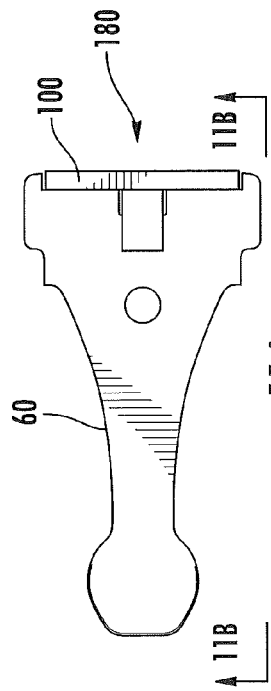
FIG. 10
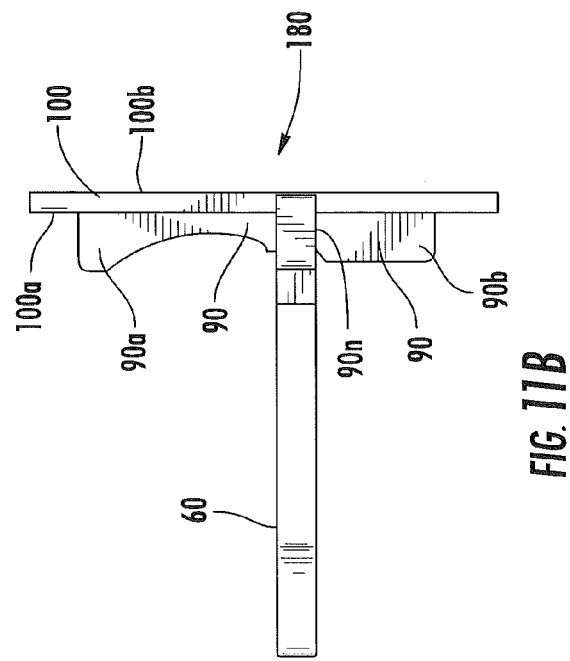
FIG. 11A
FIG. 11B
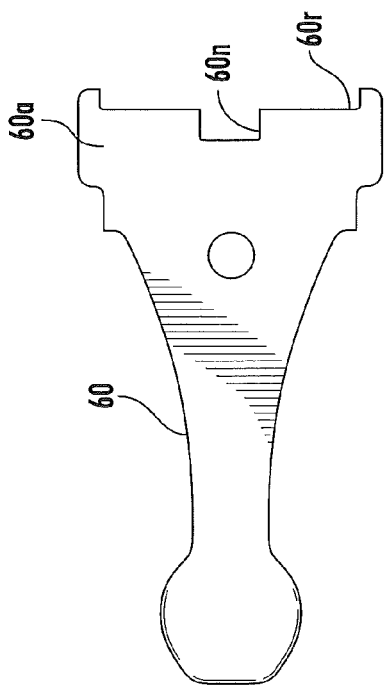
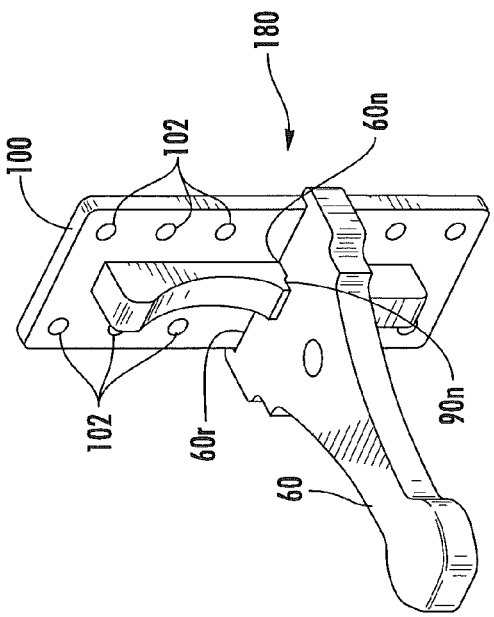
FIG. 11C

WEIGHT DISTRIBUTION HITCH APPARATUS

RELATED APPLICATION

This application is a divisional application of pending U.S. patent application Ser. No. 12/939,644, filed Nov. 4, 2010, the disclosure of which is incorporated herein by reference as if set forth in its entirety.

FIELD OF THE INVENTION

The present invention relates generally to vehicle towing and, more particularly, to hitch assemblies for towing vehicles.

BACKGROUND

Powered and trailed vehicles are conventionally interconnected for travel by coupling hitches involving fixed locations on the vehicles. Using ball and socket-type universal connections or pin-type connections, the required relative movement during travel is provided; The fixed locations, however, may be difficult to effect, particularly with large vehicles that prevent ready manual alignment for final coupling. In many instances, the receiving hitch of a towing vehicle may be misaligned both horizontally and vertically relative to the tongue of a towed vehicle.

When accurate alignment is not obtained, conventionally the towed vehicle is manually moved to proper position, which may require strength, dexterity and multiple personnel, often with an attendant risk of injury. As the tongue weight of a towed vehicle increases, the skill required and risk associated with coupling the towed vehicle to a towing vehicle may be substantially increased. The problem may be particularly troublesome for large steerable wheel trailers, such as those employed by the military.

Telescoping and pivoting hitches have been proposed to allow coupling between misaligned vehicles. Most are designed for lighter weight trailers and unsuited for heavy load applications. Others provide only a length-dependent articulation reducing the accommodated zone of vehicle misalignment.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to some embodiments of the present invention, a hitch apparatus includes a housing configured to be attached to a vehicle, a tow bar movably disposed within the housing, and a height adjustment apparatus attached to a distal end of the tow bar. The tow bar is movable relative to the housing between retracted and extended positions, and is pivotable relative to the housing when in an extended position. The height adjustment member is configured to support a hitch member and is movable relative to the tow bar such that the hitch member can be positioned at a plurality of elevations. As such, the hitch member assembly has both horizontal and vertical adjustment capabilities in addition to being extendable. In other words, the hitch member assembly can overcome misalignment between a towing vehicle and a towed vehicle (e.g., a trailer, etc.) in the X, Y and Z directions. The hitch member may be any type of coupling apparatus such as a ball coupler, a pintle hook, a cushioned pintle hook, a swivel pintle hook, a lunette ring, and a clevis pin attachment. In some embodiments of the present invention, the hitch member is integral with the height adjustment apparatus.

According to some embodiments of the present invention, a hitch apparatus includes a housing configured to be attached to a vehicle, a tow bar movably disposed within the housing, a height adjustment member attached to a distal end of the tow bar, a hitch member assembly, and a fastener that removably secures the hitch member assembly to the height adjustment member at any of a plurality of elevations. The tow bar is movable relative to the housing between retracted and extended positions, and is pivotable relative to the housing when in an extended position. As such, the hitch member assembly has both horizontal and vertical adjustment capabilities in addition to being extendable (i.e., the hitch member assembly can overcome misalignment between a towing vehicle and a towed vehicle in the X, Y and Z directions).

In some embodiments, the height adjustment member includes a rear wall and opposing, elongated side walls extending outwardly from the rear wall in adjacent, spaced-apart relationship. Each side wall includes a plurality of vertically spaced apertures formed therethrough. The hitch member assembly includes a base having opposite side portions. A hitch member, such as a hitch ball, is secured to the base and the base is removably secured to the height adjustment member via a pair of support members.

In some embodiments, each hitch member assembly support member has first and second elongated segments oriented substantially transverse to each other. The first segment of each support member is secured to a respective side of the base and the second segment of each support member includes a pair of spaced-apart apertures formed therethrough. A fastener is engagable with aligned apertures in the support members and height adjustment member side walls at selected elevations.

In some embodiments, the height adjustment member is a plate having opposing front and rear sides and rows of vertically spaced apertures formed therethrough. The height adjustment member is configured to support a hitch member, such as a pintle hook or a lunette ring, at a plurality of selected elevations.

In some embodiments, the height adjustment member includes an elongated stiffening member attached to a rear wall thereof. The stiffening member includes a notch that matingly engages a corresponding notch in the tow bar distal end.

According to other embodiments of the present invention, a hitch apparatus includes a housing configured to be attached to a vehicle, and a tow bar movably disposed within the housing. The tow bar is movable relative to the housing between retracted and extended positions, and is pivotable relative to the housing when in an extended position. A guide pin extends outwardly from a surface of a proximal end portion of the tow bar and is operably engaged with a slot in the housing to limit movement of the tow bar relative to the housing. An elongated height adjustment member is attached to a distal end of the tow bar and includes a hitch member assembly and fastener for removably securing the hitch member assembly to the height adjustment member at any of a plurality of elevations. As such, the hitch member assembly has both horizontal and vertical adjustment capabilities in addition to being extendable (i.e., the hitch member assembly can overcome misalignment between a towing vehicle and a towed vehicle in the X, Y and Z directions).

In some embodiments, the height adjustment member includes a rear wall and opposing, elongated side walls extending outwardly from the rear wall in adjacent, spaced-apart relationship. Each side wall includes a plurality of vertically spaced apertures formed therethrough. The hitch member assembly includes a base having opposite side portions. A hitch member, such as a hitch ball, is secured to the base and the base is removably secured to the height adjustment member via a pair of support members.

In some embodiments, the height adjustment member is a plate having opposing front and rear sides and rows of vertically spaced apertures formed therethrough. The height adjustment member is configured to support a hitch member, such as a ball coupler, a pintle hook, a cushioned pintle hook, a swivel pintle hook, a lunette ring, or a clevis pin attachment, at a plurality of selected elevations.

According to other embodiments of the present invention, a hitch apparatus includes a housing configured to be attached to a vehicle, a tow bar movably disposed within the housing, and a weight distribution apparatus attached to a distal end of the tow bar. The tow bar is movable relative to the housing between retracted and extended positions, and is pivotable relative to the housing when in an extended position. The weight distribution apparatus comprises a hitch member configured to receive a coupling apparatus of a towed vehicle, and at least one weight distributing member configured to extend rearwardly from the vehicle and be attached to the towed vehicle. The hitch member may be any type of coupling apparatus such as a ball coupler, a pintle hook, a cushioned pintle hook, a swivel pintle hook, a lunette ring, and a clevis pin attachment.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

FIG. 1 is a top perspective view of a towing apparatus with a height adjustment assembly, according to some embodiments of the present invention.

FIG. 2 is a partial top plan view of the towing apparatus of FIG. 1 with the tow bar removed for clarity.

FIG. 3A is a cross-sectional view of the towing apparatus of FIG. 2 taken along lines 3A-3A.

FIG. 3B is a cross-sectional view of the towing apparatus of FIG. 2 taken along lines 3B-3B.

FIG. 8 is a top plan view of the tow bar of FIG. 1, according to some embodiments of the present invention.

FIG. 9A is a plan view of the tow bar of FIG. 7A with a height adjustment member attached to a distal end thereof.

FIG. 9B is a side elevation view of the tow bar and height adjustment member of FIG. 9A taken along lines 9B.

FIG. 10 is a plan view of a tow bar for the hitch apparatus of FIG. 1 according to other embodiments of the present invention.

FIG. 11A is a plan view of the tow bar of FIG. 10 with a height adjustment member attached to a distal end thereof.

FIG. 11B is a side elevation view of the tow bar and height adjustment member of FIG. 11A taken along lines 11B.

FIG. 11C is a rear perspective view of the tow bar and height adjustment member of FIG. 11A.

DETAILED DESCRIPTION

Figure 4:
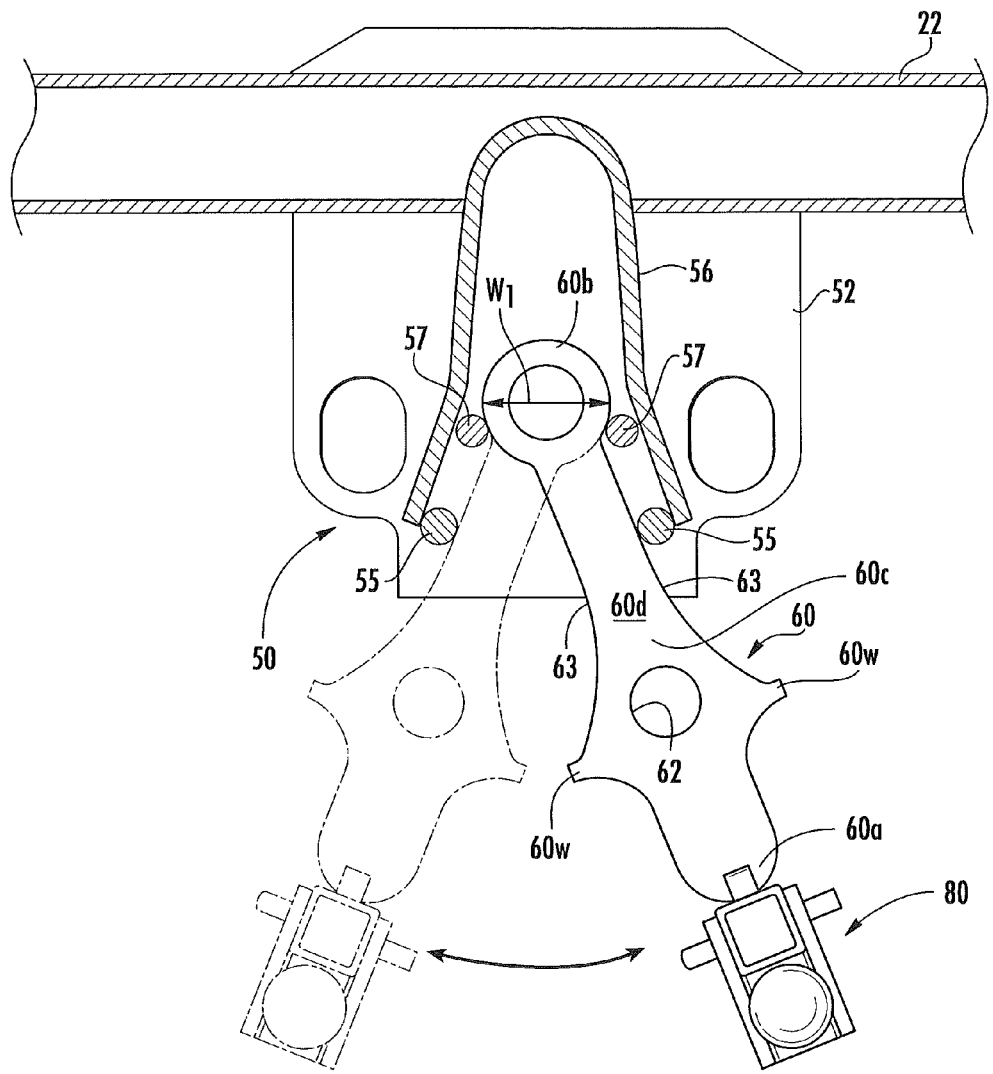
FIGS. 4-6 are partial cut-away plan views of the towing apparatus of FIG. 1 illustrating movement of the tow bar relative to the hitch apparatus housing, according to some embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain components or features may be exaggerated for clarity, and broken lines illustrate optional features or elements unless specified otherwise. In addition, the sequence of operations (or steps) is not limited to the order presented in the figures and/or claims unless specifically indicated otherwise. Features described with respect to one figure or embodiment can be associated with another embodiment of figure although not specifically described or shown as such.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that although the terms first and second are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention. Like numbers refer to like elements throughout.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The term "vehicle" includes all types of vehicles including, but not limited to, automobiles, trucks, military vehicles, airplanes, trains, etc., and also includes towed vehicles and towing vehicles.

Referring now to FIG. 1, a towing apparatus 10 for a vehicle, according to some embodiments of the present invention, is illustrated. The illustrated towing apparatus 10 includes a frame 20 that is configured to be mounted to a vehicle, and a hitch apparatus 40 secured to the frame 20. The frame 20 includes an elongated base member 22 with a generally rectangular cross section (e.g., the base member is rectangular tubing) and opposite end portions 22a, 22b. A pair of arms 24 extend away from the base member end portions 22a, 22b in side by side, spaced-apart relationship, as illustrated, to give the frame a generally U-shaped configuration.

Each illustrated arm 24 includes a substantially flat web portion 26 with an upper free edge 28 and a lower free edge 30. The upper free edge 28 is angled relative to the web portion 26 to form a bracket portion 32, as illustrated. The lower free edge 30 in the illustrated embodiment is also angled relative to the web portion 26. The angled lower edge 30 may provide structural rigidity to the arm 24 and may also help reduce the amount of space beneath a vehicle that is occupied by the frame 20. The shape of each arm 24 may be specifically designed to cooperate with the chassis/frame and/or underside of a particular vehicle model. Moreover, the shape and configuration of the free edges 30, 32 of each arm, including angles relative to the web portion 26, may be specifically designed to cooperate with the chassis/frame and/or underside of a particular vehicle model.

In the illustrated embodiment, the bracket portion 32 of each arm 24 is substantially perpendicular to the web portion 26. This configuration of the bracket portion 32 facilitates attachment of the bracket portion 32 to a surface of a vehicle chassis/frame member (or other structural member). The bracket portion 32 of each arm 24 includes a plurality of openings 34a, 34b formed therethrough. Openings 34a, 34b are sized and positioned to receive fasteners therethrough that fixedly secure each arm 24 to the chassis/frame (or other structural member) of a vehicle. The number, configuration and orientation of the openings 34a, 34b may be specifically designed for a particular vehicle. For example, these openings 34a, 34b may be aligned with respective openings (or existing fasteners) in the chassis/frame (or other structural member) of a vehicle through which new or existing fasteners (e.g., bolts, screws, threaded rods, rivets, etc.) can be inserted. Each arm 24 may also be fixedly secured to a vehicle chassis/frame (or other structural member) via welding or via a combination of welding and fasteners.

Still referring to FIG. 1, each arm 24 includes an opening 36 in an end portion 26a of the web portion 26 that is configured to receive a respective base member end portion 22a, 22b therethrough. In the illustrated embodiment, each opening 36 has a rectangular configuration to accommodate the rectangular configuration of the base member 22. The base member 22 is fixedly secured to each arm 24 via welding or fasteners or via a combination of welding and fasteners.

Embodiments of the present invention are not limited to the illustrated configuration of the arms 26 and frame base member 22. Each of these elements can have various configurations and shapes to facilitate mounting of the towing apparatus 10 to the underside of a particular vehicle. In some embodiments, base member 22 can be formed from rectangular tubing or tubing of another shape. The various components of the towing apparatus 10 can be formed from various materials known to those skilled in the art. Exemplary material for one or more components includes, but is not limited to, case-hardened steel.

The hitch apparatus 40 is secured to the base member 22 at a medial location between the two arms 24, as illustrated. The hitch apparatus 40 includes a housing 50 and a tow bar 60 movably disposed within the housing 50. The tow bar 60 is movable relative to the housing 50 between retracted and extended positions, and is pivotable relative to the housing 50 when in extended positions. The illustrated hitch apparatus housing 50 is defined by a base plate 52, an upper plate 54, and an arcuate member 56 sandwiched between the upper plate 54 and base plate 52 to form a peripheral wall of the housing 50. A tube member 58 is secured to frame base member 22 and to the upper plate 54, as illustrated. The tube member 58, base plate 52 and upper plate 54 are all secured to the frame base member 22, for example, via welding and/or fasteners. The base plate 52 and upper plate 54 are also secured together via fasteners 55, such as bolt 55a and nut 55b. However, other types of fasteners may be utilized, without limitation. A pair of posts 57 (FIGS. 2, 3A, 3B) also extend between the upper plate 54 and base plate 52 within the housing 50 and form a restricted opening 51a (FIG. 3A) that is described below. In the illustrated embodiment, posts 57 are secured in place via respective brackets 59 that are secured to the upper plate 54 via fasteners 55.

Still referring to FIG. 1, the hitch apparatus 40 includes a height adjustment assembly 80. As will be described in greater detail below, the height adjustment assembly 80 includes an elongated height adjustment member 82 attached to the distal end 60a of the tow bar 60, a hitch member assembly 84, and at least one fastener 80p configured to removably secure the hitch member assembly to the height adjustment member at any of a plurality of elevations.

The hitch apparatus housing 50 defines a longitudinally extending forwardly opening cavity 51 with a restricted opening 51a (defined by posts 57). As illustrated in FIG. 4, the tow bar 60 has a distal end portion 60a and a proximal end portion 60b connected by a center or medial portion 60c. The proximal end portion 60b has an enlarged configuration with a width $W_1$ that is greater than the width of the restricted opening 51a (i.e., the distance between posts 57) and such that the proximal end portion 60b cannot be extended through the restricted opening 51a. The tow bar medial portion 60c includes outwardly diverging curvilinear edge portions 63 that cooperate with the restricted opening 51a such that an extent to which the tow bar 60 can pivot relative to the housing 50 progressively increases as the tow bar 60 is progressively extended and, conversely, an extent to which the tow bar 60 can pivot relative to the housing 50 progressively decreases as the tow bar 60 is progressively retracted from an extended position. As such, the tow bar 60 can pivot in any extended position, but the degree to which the tow bar 60 can pivot varies depending on how far out the tow bar 60 is extended.

Embodiments of the present invention are not limited to the illustrated configurations of the housing 50 and tow bar 60 shown in FIGS. 1-6. Various other housing a tow bar configurations may be utilized, without limitation. For example, another housing and tow bar configuration that may utilize a height adjustment assembly according to embodiments of the present invention is described in U.S. Pat. No. 7,584,984, which is incorporated herein by reference in its entirety.

Figure 5:
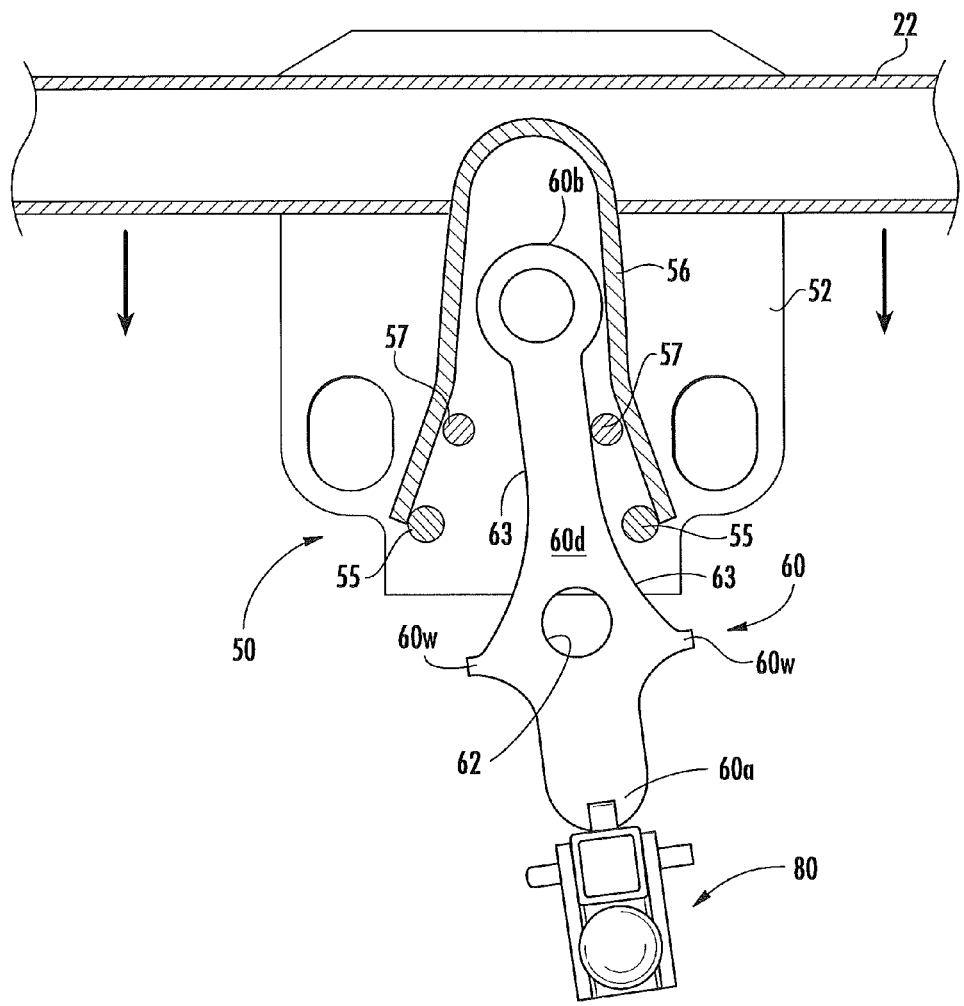

Referring back to FIG. 1, a locking mechanism 70 is operably secured to the tube member 58 and is configured to releasably engage the tow bar 60 to maintain the tow bar 60 in a retracted position. The locking mechanism 70 includes a housing 71 that is in communication with the hitch apparatus housing cavity 51 and that extends through the tube member 58, as illustrated. A locking member 72 is movably secured within the housing 71 and is movable between a position wherein a free end (not shown) of the locking member 72 is inserted through the tow bar opening 62 to maintain the tow bar 60 in a fully retracted position (FIGS. 1 and 6), and a position wherein the locking member free end is disengaged from the tow bar opening 62 (FIGS. 4 and 5). The illustrated locking member 72 includes a handle 72a to facilitate disengaging the locking member 72 from the tow bar 60 by a user.

Figure 6:
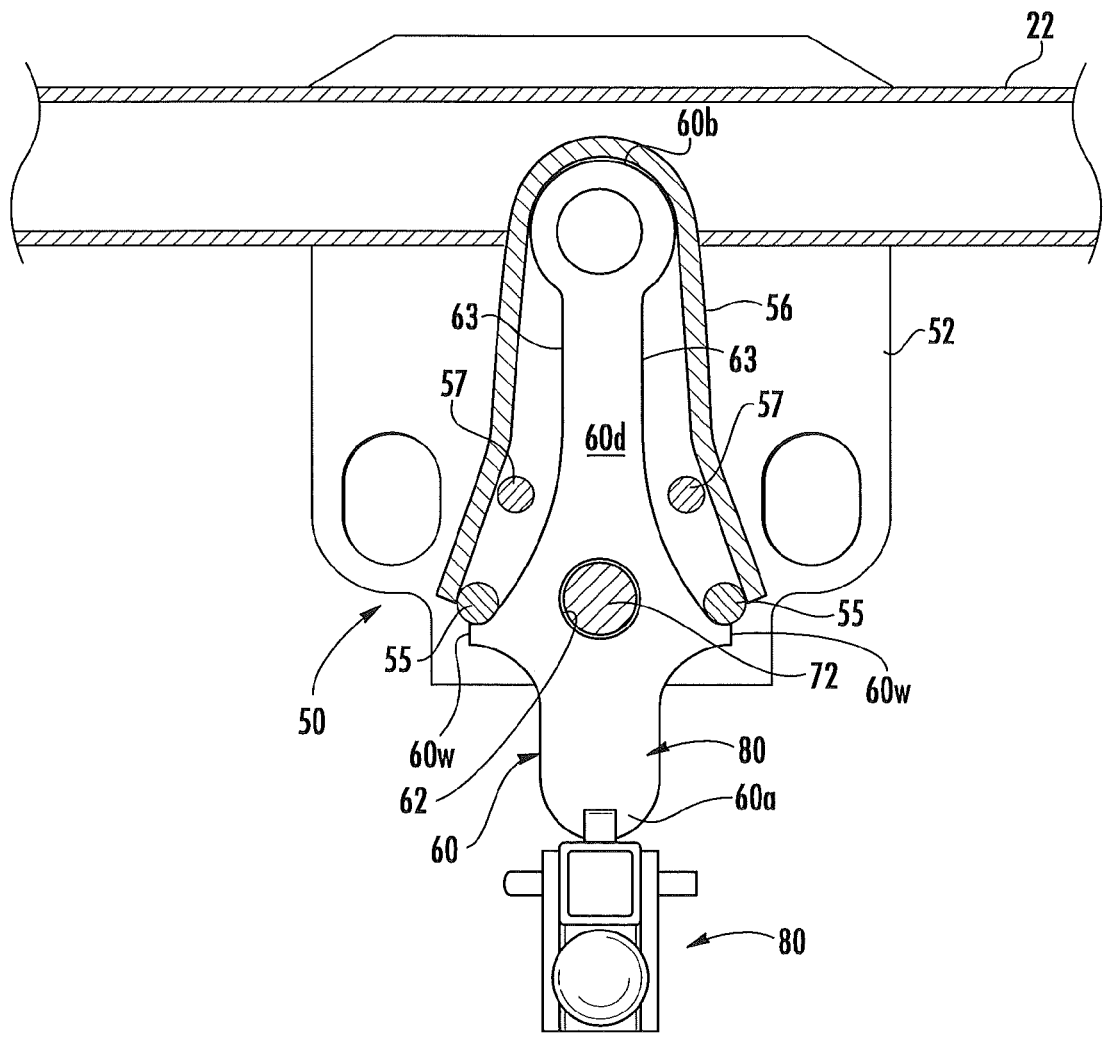

A biasing member (not shown), such as a spring, is operably associated with the locking member 72 within the housing 71 and compressively biases the locking member 72 toward the tow bar 60, as would be understood by those skilled in the art of the present invention. The biasing member is configured to help retain the locking member within the tow bar opening 62 when the tow bar 60 is retracted (FIGS. 1 and 6). In addition, when the locking member 72 is disengaged from tow bar opening 62 and the tow bar 60 is in any extended position, the biasing member urges the locking member 72 into contact with the upper surface 60d of the tow bar 60. When the tow bar 60 is moved back to the fully retracted position, the biasing member urges the locking member 72 into the tow bar opening 62 to secure the tow bar 60 in the fully retracted position and prevent movement thereof.

FIGS. 4-6 illustrate movement of the tow bar 60 relative to the hitch apparatus housing 50. The tow bar 60 is fully extended in FIG. 4, partially extended in FIG. 5, and fully retracted in FIG. 6. In FIG. 6, the locking member 72 is engaged with the tow bar opening 62. In FIG. 4, the tow bar 60 is fully extended and the proximal end portion 60b thereof cannot pass through the restricted opening 51a (i.e., between posts 57). The tow bar 60 is free to pivot from one side to another. As the tow bar 60 is extended and retracted, an edge portion 63 may contact a respective post 57 and slide therealong, as illustrated in FIG. 5. The portion of a post 57 that a respective tow bar edge portion 63 contacts may have a smooth surface to reduce friction therebetween during extension and retraction of the tow bar 60. In addition, one or more portions of the housing upper and lower plates 54, 52 may utilize a low friction material to facilitate movement of the tow bar 60. The illustrated tow bar 60 includes wing portions 60w that contact fasteners 55 when the tow bar 60 is in the fully retracted position, as illustrated in FIG. 6.

Referring now to FIGS. 7A-7B, 8 and 9A-9B, the height adjustment assembly 80 attached to the tow bar 60 of the hitch apparatus 40 of FIG. 1 will be described in greater detail. The height adjustment assembly 80 includes an elongated height adjustment member 82 attached to the distal end 60a of the tow bar 60, a hitch member assembly 84, and at least one fastener 80p configured to removably secure the hitch member assembly to the height adjustment member at any of a plurality of elevations.

The illustrated height adjustment member 82 is a tubular member having a rear wall 82a, elongated side walls 82b, 82c, and a front wall 82d. The side walls 82b, 82c extend outwardly from the rear wall 82a in adjacent, spaced-apart relationship, and each side wall 82b, 82c includes a plurality of vertically spaced apertures 83 formed therethrough. Although illustrated as a tubular member, height adjustment member 82 can have various shapes and configurations. Embodiments of the present invention are not limited to the illustrated tubular configuration of height adjustment member 82. For example, in some embodiments, the height adjustment member 82 can have a "U"-shaped configuration with a rear wall 82a and side walls 82b, 82c extending outwardly therefrom in adjacent, spaced-apart relationship.

The hitch member assembly 84 includes a base 85 and a hitch member 86 secured to the base 85. The illustrated hitch member 86 is a hitch ball. The hitch ball 86 includes a threaded member 86a that extends through an opening 85e in the base 85. A nut 86b threadingly engages the threaded member 86a and secures the ball 86 to the base. The base 85 includes opposite upper and lower surfaces 85a, 85b, and opposite side portions 85c, 85d. A pair of "L"-shaped support members 88 are attached to the base side portions 85c, 85d, such as via welding or fasteners, or a combination of welding and fasteners, and are utilized to secure the hitch member assembly 84 to the height adjustment member 82. Each support member 88 in the illustrated embodiment has first and second elongated segments 88a, 88b oriented substantially transverse to each other. The first segment 88a of each support member 88 is secured to a respective side 85c, 85d of the base 85. The second segment 88b of each support member 88 includes a pair of spaced-apart apertures 89 formed therethrough. In the illustrated embodiment, the first and second elongated segments 88a, 88b are oriented substantially orthogonal to each other. However, in other embodiments, the first and second elongated segments 88a, 88b can be oriented relative to each other at various angles. Moreover, support members 88 are not limited to the illustrated "L" shape. Support members 88 may have various other shapes and configurations, as would be understood by those skilled in the art of the present invention. In addition, although illustrated and described as an assembly, the hitch member assembly 84 can be a unitary article formed from a casting, for example.

In the illustrated embodiment, the elevation of the hitch member assembly 84 is selected by aligning apertures 89 in the support members 88 with corresponding apertures 83 in the height adjustment member side walls 82b, 82c. A fastener 80p is extended through the aligned apertures 83, 89 to removably secure the hitch member assembly 84 at the selected elevation. In the illustrated embodiment, a pair of fasteners 80p, such as pins, are utilized. Each of the fasteners 80p includes an aperture 80t formed through a distal end thereof, as illustrated. Aperture 80t is configured to receive a clip or cotter pin to prevent unwanted removal of the fastener 80p, as would be understood by one skilled in the art. In other embodiments, each fastener 80 may be a threaded member, such as a bolt, that threadingly receives a nut to secure the hitch member assembly 84 at the selected elevation.

In the illustrated embodiment, the height adjustment member 82 includes an elongated stiffening member 90 attached to the rear wall 82a thereof. The stiffening member 90 includes opposite end portions 90a, 90b and a medial portion 90c therebetween. A notch 90n is formed in the medial portion 90c and is configured to matingly engage a notch 60n in the tow bar distal end portion 60a. The stiffening member 90 and tow bar may be welded together at the mating notches 60n, 90n, as would be understood by those skilled in the art of the present invention. In other embodiments, fasteners or a combination of welding and fasteners may be utilized to attach the stiffening member 90 to the tow bar. Similarly, the stiffening member 90 may be attached to the height adjustment member 90 via welding, fasteners, or a combination of welding and fasteners.

The stiffening member 90 is configured to provide structural integrity and strength to the height support member 82. In the illustrated embodiment, the stiffening member 90 has concave portion 90d between the medial portion 90c and the end portion 90a. This concave portion 90d provides clearance for the locking member handle 72 of the embodiment of FIG. 1.

Referring now to FIGS. 10 and 11A-11C, a tow bar 60 and a height adjustment assembly 180 according to other embodiments of the present invention is illustrated. The tow bar 60 is configured to be utilized with a hitch apparatus, such as hitch apparatus 40 of FIG. 1. The distal end portion 60a of the tow bar 60 of FIG. 10 is configured to receive a different height adjustment member from that illustrated in FIG. 1. Specifically, the tow bar distal end 60a of the tow bar 60 of FIG. 10 is wider than the distal end 60a of the tow bar 60 of FIG. 8. The distal end portion 60a of the tow bar 60 of FIG. 10 includes a recessed portion 60r configured to receive a height adjustment member 100 (FIGS. 11A-11C). The distal end portion 60a also includes a notch 60n within the recessed portion 60r. In the illustrated embodiment, the height adjustment member 100 is a plate having opposing front and rear sides 100a, 100b and rows of vertically spaced apertures 102 formed therethrough. The height adjustment member 100 is configured to support a hitch member, such as a pintle hook 400 (FIG. 15) or a swivel-type pintle hook 400' (FIG. 19), at a plurality of selected elevations. As known to those of skill in the art of the present invention, a pintle hook is configured to engage a lunette ring hitch. In some embodiments, a lunette ring may be secured to the height adjustment member 100.

In the illustrated embodiment, the height adjustment member 100 includes an elongated stiffening member 90 attached to the rear wall 100a thereof. The stiffening member 90 includes opposite end portions 90a, 90b and a medial portion 90c therebetween. A notch 90n is formed in the medial portion 90 and is configured to matingly engage the notch 60n in the tow bar distal end portion 60a. The stiffening member 90 and tow bar may be welded together at the mating notches 60n, 90n, as would be understood by those skilled in the art of the present invention. In other embodiments, fasteners or a combination of welding and fasteners may be utilized to attach the stiffening member 90 to the, tow bar 60. Similarly, the stiffening member 90 may be attached to the height adjustment member 90 via welding, fasteners, or a combination of welding and fasteners. The stiffening member 90 provides structural integrity and strength to the height support member 100.

Figure 12A:
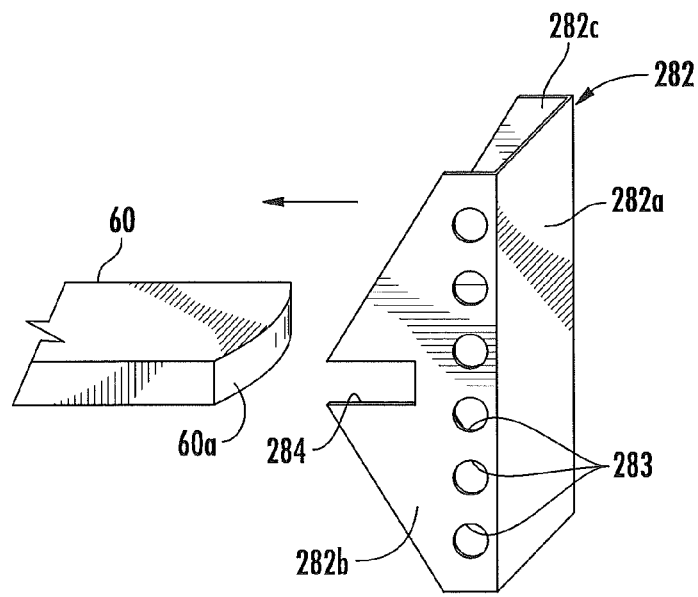
FIG. 12A is a partial perspective view of a tow bar with a height adjustment member attached to a distal end thereof, according to some embodiments of the present invention.
Figure 12B:
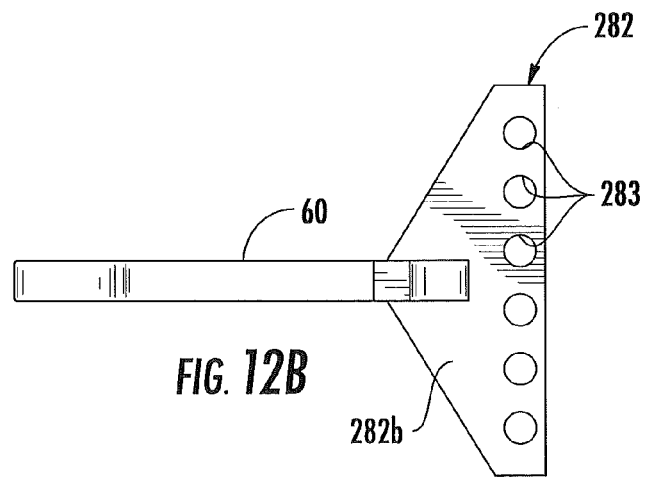
FIG. 12B is a side view of the tow bar and height adjustment member of FIG. 12A.

Referring now to FIGS. 12A-12B, a tow bar 60 and a height adjustment member 282 according to other embodiments of the present invention is illustrated. The tow bar 60 is configured to be utilized with a hitch apparatus, such as hitch apparatus 40 of FIG. 1. In contrast with the tow bar embodiments in FIGS. 8, 9A-9B, 10, 11A-11C, the distal end portion 60a of the tow bar 60 of FIGS. 12A-12B does not include a notch. The illustrated height adjustment member 282 includes a front wall 282a and side walls 282b, 282c that extend outwardly from the front wall 282a in adjacent, spaced-apart relationship. Each side wall 282b, 282c includes a plurality of vertically spaced apertures 283 formed therethrough. The apertures 283 are configured to align with corresponding apertures in a coupling apparatus, such as the hitch member assembly 84 of FIG. 7A, and receive one or more fasteners therethrough so that the coupling apparatus can be positioned at any of a plurality of elevations.

Each of the side walls 282b, 282c includes a respective notch 284 formed therein. The distal end 60a of the tow bar 60 is inserted within the notch 284 of each side wall 282b, 282c as illustrated in FIG. 12B. The side walls 282b, 282c are then welded to the distal end 60a of the tow bar to secure the height adjustment member 282 to the tow bar 60. Embodiments of the present invention are not limited to the illustrated configuration of the height adjustment member 282. The height adjustment member 282 can have various shapes and configurations. Moreover, the sidewalls 282b, 282c can have various shapes and configurations.

Figure 7B:
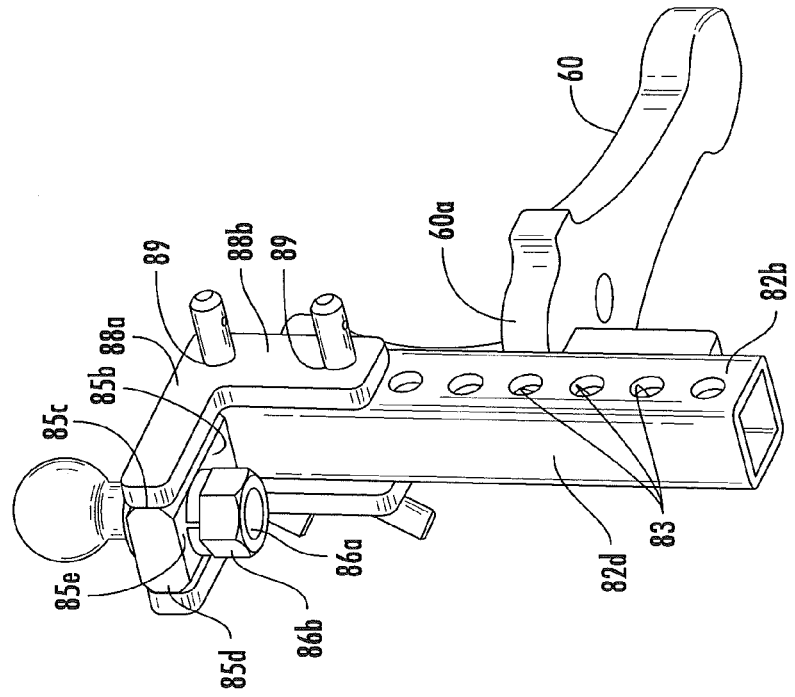
FIG. 7B is a front perspective view of the tow bar and height adjustment assembly of FIG. 7A.
Figure 7A:
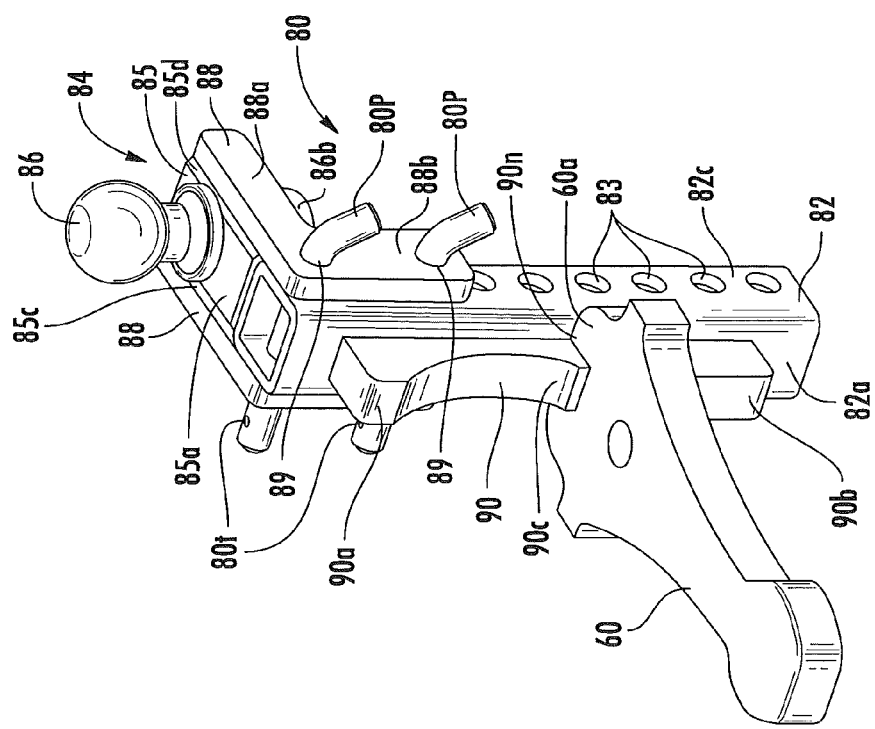
FIG. 7A is a rear perspective view of the tow bar of FIG. 1 with the height adjustment assembly attached to a distal end thereof, according to some embodiments of the present invention.
Figure 13:
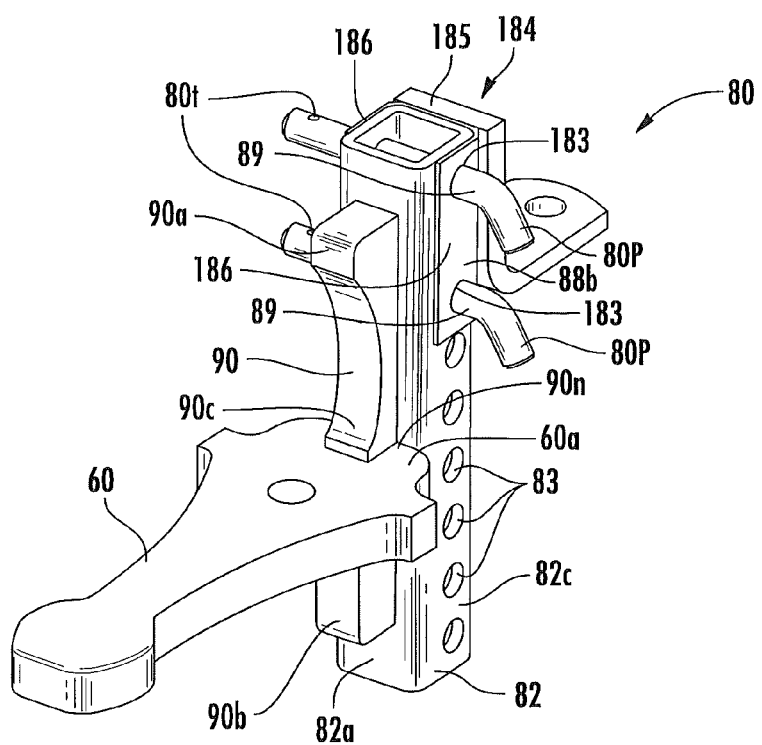
FIG. 13 is a perspective view of a tow bar with a height adjustment member attached to a distal end thereof, and having an integral coupling apparatus, according to some embodiments of the present invention.

Referring now to FIG. 13, the height adjustment assembly 80 of FIG. 7A is illustrated with a hitch member assembly 184, according to other embodiments of the present invention. The illustrated hitch member assembly 184 is a unitary article, such as formed via casting, and includes an "L"-shaped member 185 for receiving a coupling apparatus, such as a ball or pintle hook, and two spaced-apart walls 186. Each wall 186 includes a plurality of vertically spaced apertures 183 formed therethrough. The apertures 183 are configured to align with corresponding apertures 83 in the height adjustment member 82 and receive one or more fasteners 80p therethrough, so that the hitch member assembly 184 can be positioned at any of a plurality of elevations.

Figure 14:
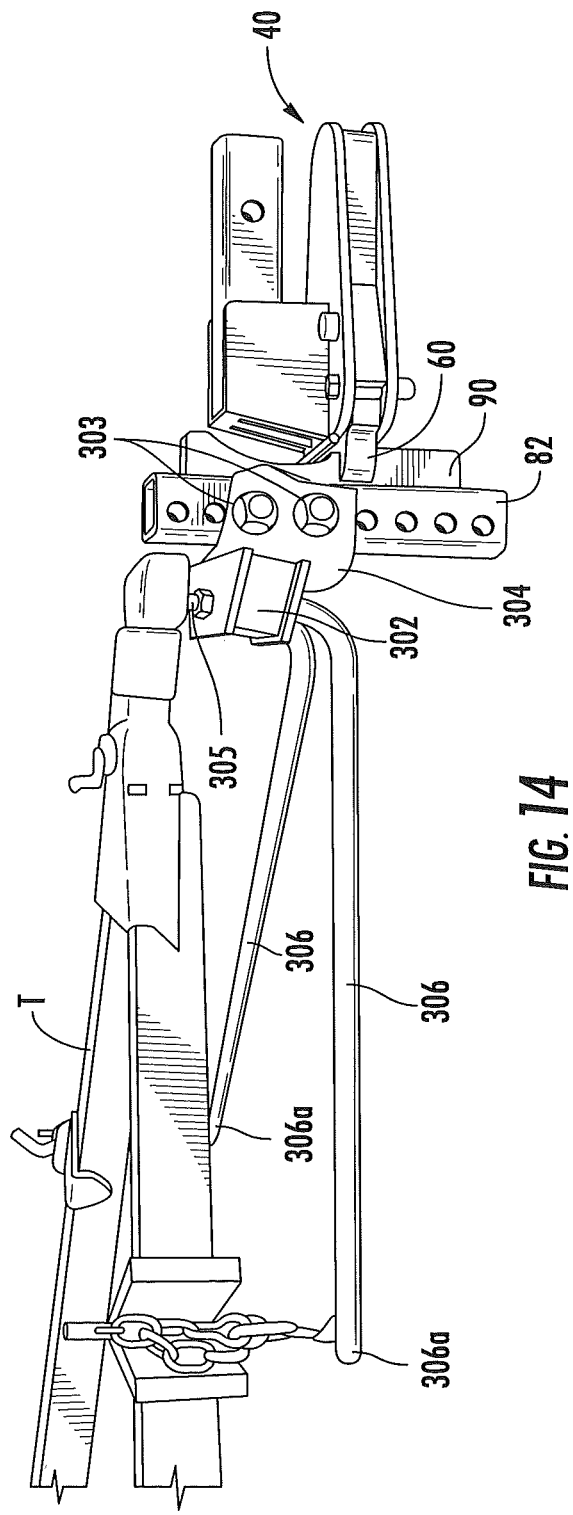
FIG. 14 is a perspective view of a weight distribution hitch attached to the height adjustment assembly of FIG. 7A, according to some embodiments of the present invention.

Referring now to FIG. 14, embodiments of the present invention may be utilized with a weight distribution hitch 300. In the illustrated embodiment, the weight distribution hitch 300 is secured to the height adjustment member 82 of FIG. 7A, and is positionable in any of a plurality of elevations, as described above. The illustrated weight distribution hitch 300 includes a base 302 that supports a ball hitch 305 or other type of coupler. A pair of spaced-apart walls 304 extend outwardly from the base 302 and are configured to be secured to the height adjustment member 82. Apertures 303 in the walls 304 are configured to align with corresponding apertures 83 in the height adjustment member 82 and receive one or more fasteners therethrough, so that the weight distribution hitch 300 can be positioned at any of a plurality of elevations.

The illustrated weight distribution hitch 300 also includes a pair of elongated rods 306 that extend outwardly from the base 302, as illustrated. The distal end 306a of each rod 306 is configured to be attached to a respective portion of the frame of a trailer T. As would be understood by those skilled in the art of hitch apparatus, the weight distribution hitch 300 is configured to evenly distribute weight over the entire length of a towing vehicle and trailer T, resulting in a level ride with better control and stability. Moreover, the weight distribution hitch 300 can facilitate better braking, less strain on the towing vehicle and increased towing capacity. Use of a height adjustment member, however, is not required. The weight distribution member may be configured to be attached directly to the tow bar distal end.

Referring now to FIGS. 15-21, a hitch apparatus 140 having a different configuration from that of the hitch apparatus 40 of FIG. 1 is illustrated. The hitch apparatus 140 may be secured to a vehicle via a frame, such as frame 20 illustrated in FIG. 1. The hitch apparatus 140 may also be secured to a vehicle in other ways.

Figure 15:
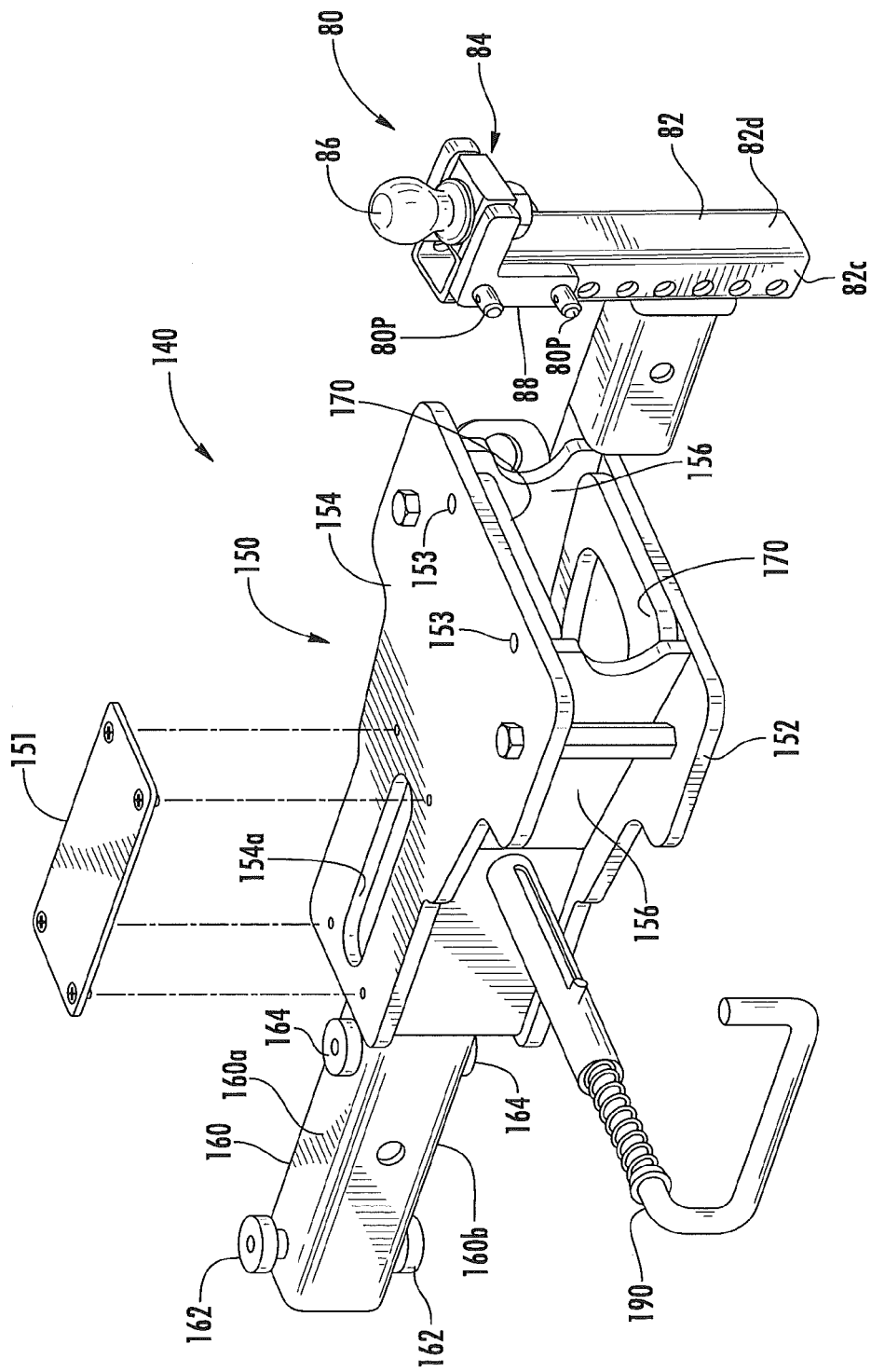
FIG. 15 is a top perspective view of a hitch apparatus, according to other embodiments of the present invention.

The hitch apparatus 140 includes a housing 150 and a tow bar 160 movably disposed within the housing 150. The tow bar 160 is movable relative to the housing 150 between retracted and extended positions, and is pivotable relative to the housing 150 when in extended positions, similar to tow bar 60 of FIGS. 1-6. The illustrated hitch apparatus housing 150 is defined by a base plate 152, an upper plate 154, and diverging side walls 156 between the upper plate 154 and base plate 152. Included within the housing 150 are a pair of tow bar guide members 170. Each tow bar guide member 170 is attached to an interior surface of a respective one of the base and upper plates 152, 154 as illustrated in FIG. 15. Each tow bar guide member 170 includes alignment pins 174 that engage respective apertures 153 in the housing upper and lower plates 154, 152 to facilitate proper alignment of the tow bar guide members 170 in the housing 150. The tow bar guide members 170 may be secured to the upper and lower plates 154, 152 in various ways including welding, fasteners, or a combination of welding and fasteners.

Figure 16:
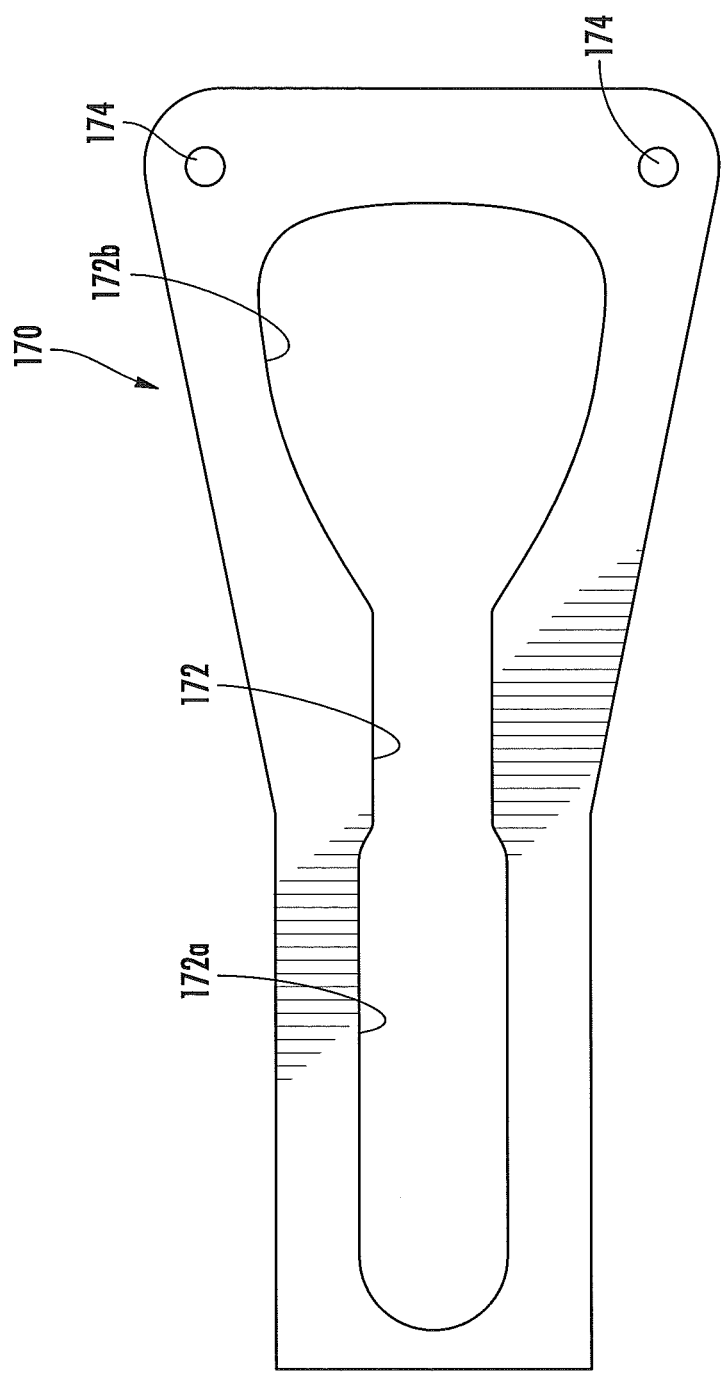
FIG. 16 is a top plan view of one of the tow bar guide members of the hitch apparatus of FIG. 15.

The tow bar 160 is an elongated tubular member having opposite upper and lower sides 160a, 160b. A pair of guides 162, 164 extend outwardly from the upper and lower sides 160a, 160b, as illustrated. Guides 162, 164 are configured to be operatively engaged with an opening 172 formed in each of the tow bar guide members 170. As illustrated in FIG. 16, each tow bar guide member 170 includes an opening 172 therein. The opening 172 has an elongated portion 172a and a generally triangular shaped portion 172b with arcuate sides. Tow bar guides 162 extend through the elongated portion 172a and engage an elongated slot 154a in the upper plate 154 and a corresponding elongated slot (not shown) in the lower plate 152. Tow bar guides 164 are engaged with the generally triangular portion 172b in a respective tow bar guide member 170.

In the illustrated embodiment, a cover plate 151 is configured to be attached to the upper plate 154 so as to overlie the elongated slot 154a in the upper plate 154. Although not shown, a corresponding cover plate is configured to be attached to the lower plate 152 so as to overlie the corresponding elongated slot therein. A locking mechanism 190 is operably secured to the housing 150 and is configured to releasably engage the tow bar 160 to maintain the tow bar 160 in a retracted position in a similar manner as locking member 72 described above.

As illustrated in FIG. 16, the width of the triangular shaped portion 172b decreases in the direction toward the elongated portion 172a. It is the generally triangular shaped portion 172b that governs the extent to which the tow bar 160 can pivot when extended and it is the elongated portion 172a that governs the extent to which the tow bar 160 can be extended during extension and retraction thereof. The generally triangular shaped portion 172b also is designed to guide the tow bar 160 back into the housing as the tow bar 160 is retracted.

Figure 17:
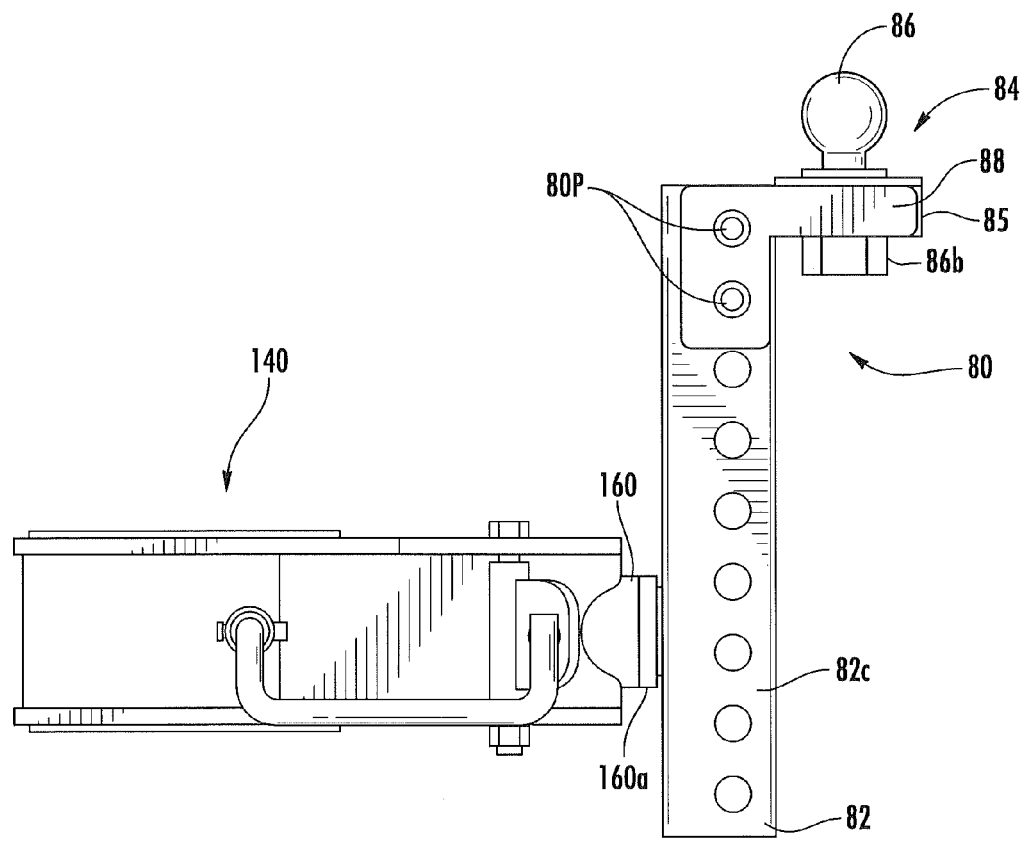
FIG. 17 is a side elevation view of the hitch apparatus of FIG. 15 with a height adjustment assembly attached to a distal end of the tow bar, according to some embodiments of the present invention.
Figure 18:
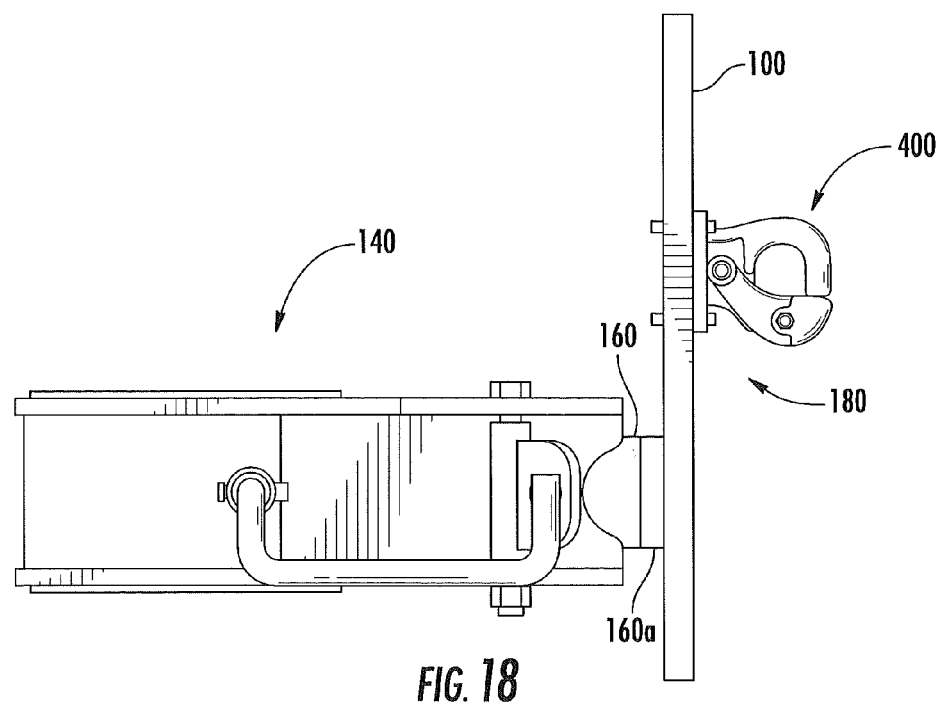
FIG. 18 is a side elevation view of the hitch apparatus of FIG. 15 with a height adjustment member attached to a distal end of the tow bar, according to other embodiments of the present invention.
Figure 19:
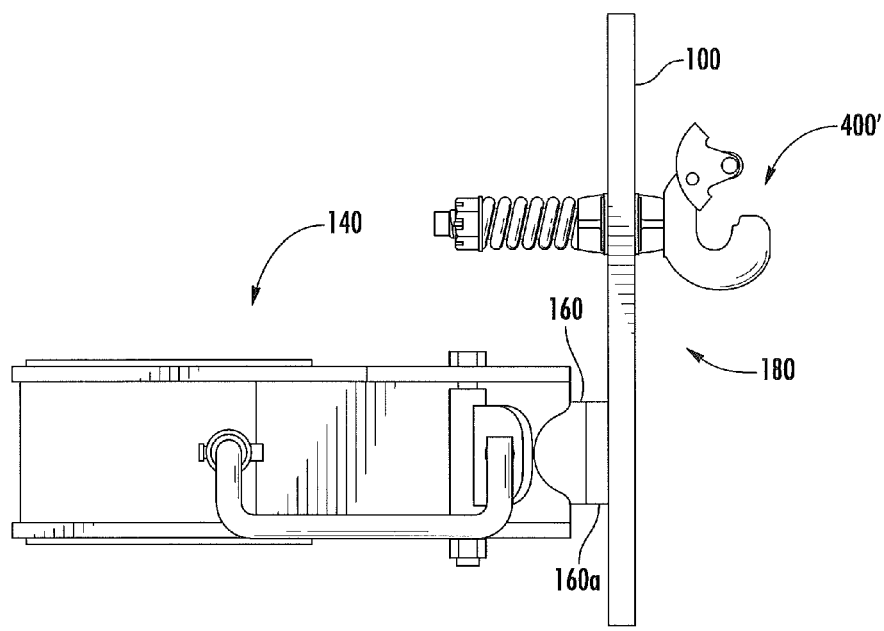
FIG. 19 is a side elevation view of the hitch apparatus of FIG. 15 with a height adjustment member attached to a distal end of the tow bar, according to other embodiments of the present invention.

Referring to FIG. 17, the height adjustment assembly 80 described above is secured to the distal end 160a of the tow bar 160 of towing apparatus 140 of FIG. 15, according to some embodiments of the present invention. In FIG. 18, the height adjustment assembly 180 described above is secured to the distal end 160a of the tow bar 160 of towing apparatus 140 of FIG. 15 and includes a pintle hook 400, according to other embodiments of the present invention. In FIG. 19, the height adjustment assembly 180 described above is secured to the distal end 160a of the tow bar 160 of towing apparatus 140 of FIG. 15 and includes a swivel-type pintle hook 400', according to other embodiments of the present invention.

Figure 20:
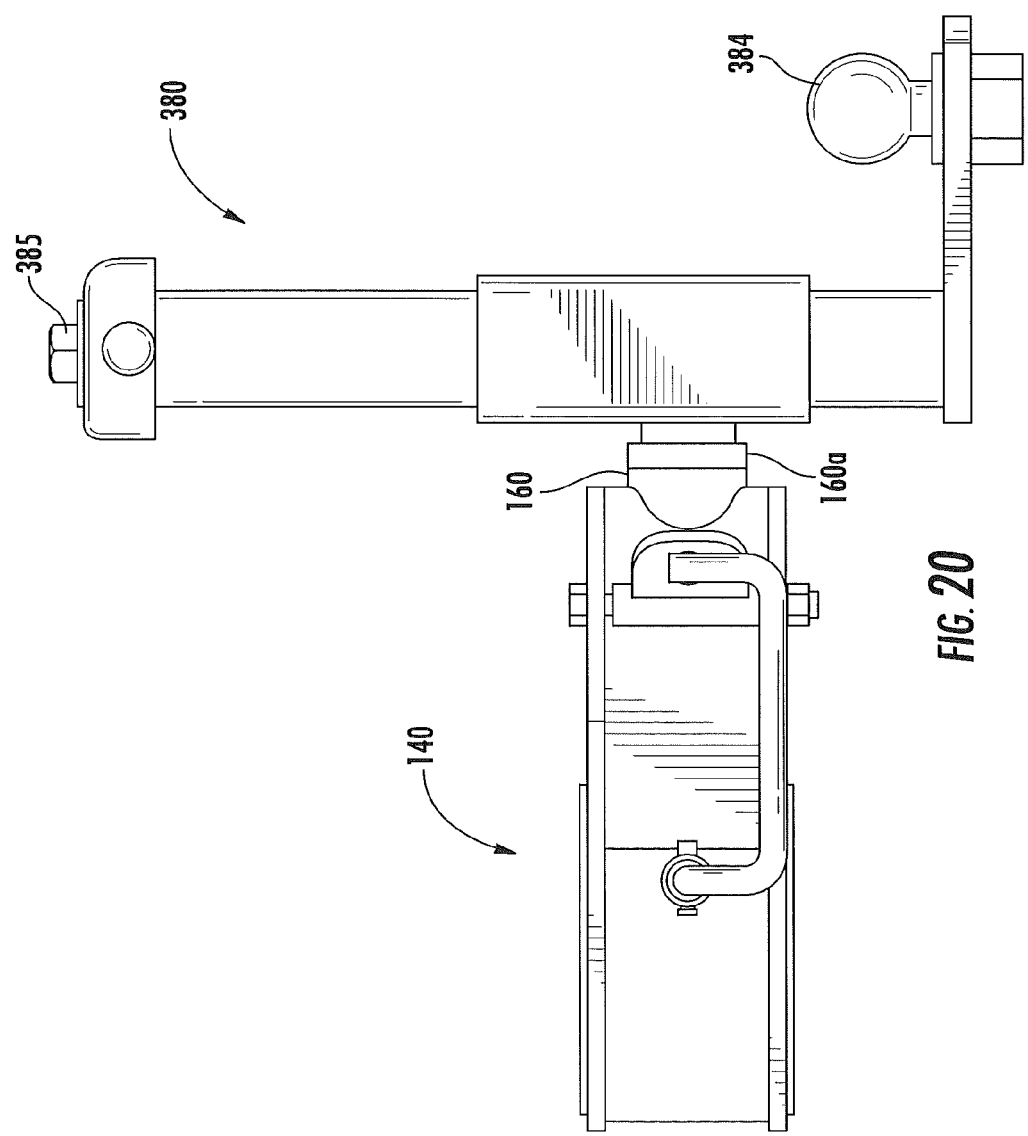
FIG. 20 is a side elevation view of the hitch apparatus of FIG. 15 with a height adjustment assembly attached to a distal end of the tow bar, according to other embodiments of the present invention.
Figure 21:
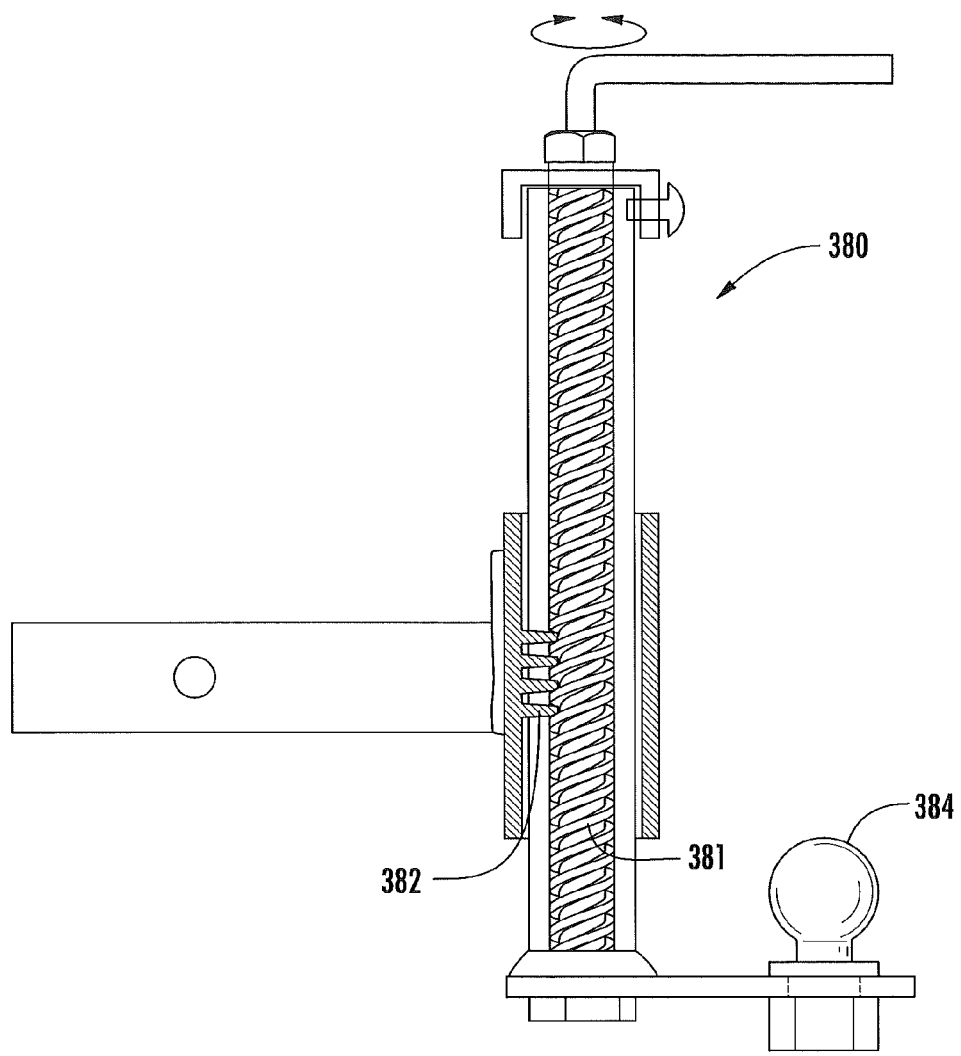
FIG. 21 is a cross-sectional view of the height adjustment assembly of FIG. 20.

Referring now to FIGS. 20-21, a height adjustment assembly 380 that is configured to be utilized with a hitch apparatus, such as hitch apparatus 140 of FIG. 15, is illustrated. Although shown with the hitch apparatus 140, height adjustment assembly 380 can be utilized with the hitch apparatus 40 of FIGS. 1-14, as well. The illustrated height adjustment assembly 380 utilizes a threaded rod 381 interengaged with a worm gear 382 to allow for infinite elevation positions of the ball mount 384. The height adjustment assembly 380 can be utilized while a trailer is attached thereto to facilitate level towing. The ball mount 384 can be raised or lowered, by turning nut 385 attached to the threaded rod 381 with a wrench, socket, or ratchet drive, as illustrated in FIG. 21.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A hitch apparatus, comprising:
    a housing configured to be attached to a vehicle;
    a tow bar movably disposed within the housing, wherein the tow bar comprises opposite proximal and distal ends and is movable relative to the housing between retracted and extended positions, wherein the tow bar is pivotable relative to the housing when in an extended position, wherein an extent to which the tow bar can pivot relative to the housing progressively increases as the tow bar is progressively extended, and wherein a guide pin extends outwardly from a surface of a proximal end portion of the tow bar and is operably engaged with a slot in the housing to limit movement of the hitch assembly relative to the housing; and
    a weight distribution apparatus attached to the distal end of the tow bar, wherein the weight distribution apparatus comprises a hitch member configured to receive a coupling apparatus of a towed vehicle, and at least one weight distributing member configured to extend rearwardly from the vehicle and be attached to the towed vehicle.

2. The hitch apparatus of claim 1, further comprising an elongated height adjustment member attached to a distal end of the tow bar, wherein the height adjustment member is configured to support the weight distribution apparatus hitch member at a plurality of elevations.

3. The hitch apparatus of claim 2, comprising at least one fastener configured to removably secure the weight distribution apparatus to the height adjustment member at any of the plurality of elevations.

4. The hitch apparatus of claim 1, wherein the weight distribution apparatus comprises a base that supports the hitch member, and wherein the at least one weight distributing member comprises a pair of elongated rods that extend outwardly from the base, wherein each elongated rod comprises a distal end that is configured to be attached to a respective portion of a frame of the towed vehicle.

5. The hitch apparatus of claim 4, wherein the towed vehicle comprises a trailer and wherein each elongated rod distal end is configured to be attached to a respective portion of a frame of the trailer.

6. The hitch apparatus of claim 1, wherein the hitch member is selected from the group consisting of a ball coupler, a pintle hook, a cushioned pintle hook, a swivel pintle hook, a lunette ring, and a clevis pin attachment.

* * * * *